US012094347B2

(12) United States Patent
Lala

(10) Patent No.: US 12,094,347 B2
(45) Date of Patent: Sep. 17, 2024

(54) METHODS AND SYSTEMS FOR VISUALIZING AVAILABILITY AND UTILIZATION OF ONBOARDS SERVICES IN VESSELS

(71) Applicant: ViaSat, Inc., Carlsbad, CA (US)

(72) Inventor: Sanjay V. Lala, Temecula, CA (US)

(73) Assignee: VIASAT, INC., Carlsbad, CA (US)

( * ) Notice: Subject to any disclaimer, the term of this patent is extended or adjusted under 35 U.S.C. 154(b) by 12 days.

(21) Appl. No.: 17/760,683

(22) PCT Filed: Nov. 1, 2019

(86) PCT No.: PCT/US2019/059540
§ 371 (c)(1),
(2) Date: Mar. 15, 2022

(87) PCT Pub. No.: WO2021/086405
PCT Pub. Date: May 6, 2021

(65) Prior Publication Data
US 2022/0392350 A1      Dec. 8, 2022

(51) Int. Cl.
*G08G 3/00* (2006.01)
*G06F 3/04842* (2022.01)

(52) U.S. Cl.
CPC ........... *G08G 3/00* (2013.01); *G06F 3/04842* (2013.01)

(58) Field of Classification Search
CPC .............................. G08G 3/00; G06F 3/04842
See application file for complete search history.

(56) References Cited

U.S. PATENT DOCUMENTS

| | | | | |
|---|---|---|---|---|
| 6,058,370 A | * | 5/2000 | Church | G06Q 10/02 701/1 |
| 6,335,733 B1 | * | 1/2002 | Keren | G06Q 10/06 345/440.1 |
| 8,442,874 B2 | * | 5/2013 | Moorhead | G06Q 10/02 705/26.1 |

(Continued)

OTHER PUBLICATIONS

The International Searching Authority, "Search Report" in Application No. PCT/US2019/059540, dated Jul. 2, 2020, 16 pages.

(Continued)

*Primary Examiner* — Jeremy L Stanley
(74) *Attorney, Agent, or Firm* — HOLZER PATEL DRENNAN

(57) ABSTRACT

Systems and methods for displaying onboard service information for vessels are described. In some embodiments, a method comprises obtaining time range data indicating a time range; obtaining corresponding trips within the time range for each of a plurality of vessels; and obtaining status of an onboard service provided during each trip of the corresponding trips for each of the plurality of vessels. In response to receiving a request for displaying service performance information for the plurality of vessels, first graphical interface data is generated. The data represents a plurality of vessel identifiers that corresponds to the plurality of vessels; a plurality of trip icons for the corresponding trips for each of the plurality of vessels, and a timeline that represents the time range. The data is transmitted to a display device to cause the display device to generate and to display a trip-schedule viewer representation.

22 Claims, 12 Drawing Sheets

(56) References Cited

U.S. PATENT DOCUMENTS

| | | | | |
|---|---|---|---|---|
| 8,700,440 B1* | 4/2014 | Ande | | G06Q 10/06 |
| | | | | 705/5 |
| 8,806,543 B1* | 8/2014 | Curtis | | G06Q 30/0241 |
| | | | | 725/77 |
| 8,984,421 B2* | 3/2015 | Canal | | G06Q 30/06 |
| | | | | 715/758 |
| 9,318,024 B1* | 4/2016 | Natwick | | H04W 4/42 |
| 10,037,705 B1* | 7/2018 | Kalyan | | G08G 5/0026 |
| 10,692,304 B1* | 6/2020 | Deyaf | | G08G 1/202 |
| 11,006,078 B1* | 5/2021 | Patel | | G06T 7/62 |
| 11,475,719 B1* | 10/2022 | Jensen | | G06Q 10/06 |
| 2004/0260598 A1* | 12/2004 | Kumhyr | | G06Q 30/0201 |
| | | | | 705/7.29 |
| 2005/0267653 A1* | 12/2005 | Matsushita | | G07C 5/008 |
| | | | | 701/14 |
| 2006/0294140 A1* | 12/2006 | Schemionek | | G06Q 10/06 |
| 2009/0070841 A1* | 3/2009 | Buga | | H04B 7/18506 |
| | | | | 725/116 |
| 2010/0042445 A1* | 2/2010 | Nicosia | | G06Q 50/30 |
| | | | | 715/810 |
| 2010/0121660 A1* | 5/2010 | Boykin | | G06Q 10/02 |
| | | | | 705/5 |
| 2010/0153875 A1* | 6/2010 | O'Flynn | | G08G 5/0026 |
| | | | | 715/764 |
| 2012/0109941 A1* | 5/2012 | Cohen | | G06F 16/9535 |
| | | | | 707/E17.014 |
| 2013/0253738 A1* | 9/2013 | Fucke | | B64D 45/00 |
| | | | | 701/14 |
| 2014/0108070 A1* | 4/2014 | Vernitsky | | G06Q 10/025 |
| | | | | 705/6 |
| 2014/0324333 A1* | 10/2014 | Maeda | | G01C 23/00 |
| | | | | 701/431 |
| 2015/0064656 A1* | 3/2015 | Garzella | | G06Q 50/14 |
| | | | | 434/30 |
| 2015/0350457 A1* | 12/2015 | Lauer | | H04B 7/18508 |
| | | | | 455/408 |
| 2016/0371988 A1* | 12/2016 | Weber | | G08G 5/003 |
| 2017/0098195 A1* | 4/2017 | Douglas | | G06Q 10/1093 |
| 2017/0124489 A1* | 5/2017 | Leavitt | | G06Q 10/02 |
| 2017/0124780 A1* | 5/2017 | Jensen | | G07C 5/008 |
| 2017/0126521 A1* | 5/2017 | Lala | | H04W 4/021 |
| 2017/0129603 A1* | 5/2017 | Raptopoulos | | G08G 5/0069 |
| 2017/0178037 A1* | 6/2017 | Kaye | | G06Q 10/02 |
| 2017/0270806 A1* | 9/2017 | Shipley | | G08G 5/003 |
| 2017/0325111 A1* | 11/2017 | Reese | | H04L 67/12 |
| 2018/0054366 A1* | 2/2018 | Hashmi | | H04W 24/02 |
| 2018/0174067 A1* | 6/2018 | Spiro | | G06N 20/00 |
| 2018/0218463 A1* | 8/2018 | Jobling | | G06Q 10/025 |
| 2019/0080615 A1* | 3/2019 | Small | | G08G 5/003 |
| 2019/0080618 A1* | 3/2019 | Small | | G08G 5/0043 |
| 2019/0147750 A1* | 5/2019 | Joyson | | G08G 5/0043 |
| | | | | 701/122 |
| 2020/0008079 A1* | 1/2020 | Halsey | | G08G 5/0039 |
| 2020/0116542 A1* | 4/2020 | Fregnani | | G06Q 50/06 |
| 2021/0183254 A1* | 6/2021 | Halsey | | G08G 5/0021 |
| 2021/0245896 A1* | 8/2021 | Sadhu | | G06F 16/245 |
| 2022/0035367 A1* | 2/2022 | Ho | | G08G 5/0043 |
| 2022/0245971 A1* | 8/2022 | Howard | | G07C 5/006 |

OTHER PUBLICATIONS

Gallimore et al., "Integrating Sensor Data with System Information Via Interactive Visualizations", 12th European Conference on Computer Vision, ECCV 2012, dated Jul. 22, 2007, 10 pages.

* cited by examiner

METHODS AND SYSTEMS FOR VISUALIZING AVAILABILITY AND UTILIZATION OF ONBOARDS SERVICES IN VESSELS

PRIORITY INFORMATION

This application is a U.S. National Stage patent application filed under 35 U.S.C. § 371 of International Patent Application No. PCT/US2019/059540 filed Nov. 1, 2019, the entire contents of which are hereby incorporated by reference as if fully set forth herein for all purposes.

BACKGROUND

Recent innovations in the satellite technologies and the high-speed network communications technologies have stimulated a rapid development of onboard services offered by the transportation industry. The onboard services may include a variety of communications and entertainment services, such as high-speed access to the Internet and computer-based entertainment. The services may be provided to crews and passengers of aircrafts, ships, trains, buses, and the like. For example, nowadays, the passengers who board an airplane or a cruise ship may use their smartphones or seatback displays to browse the Internet, communicate via electronic mail and texting, watch TV shows, movies, broadcasts, and news programs, and access streaming services.

Quality of the onboard services may be measured in terms of the quality of the onboard services availability, reliability, usability, speed, and bandwidth. As the quality of the services increases, so does the passengers' satisfaction and enjoyment. Hence, the transportation companies have been trying to achieve the highest-possible-quality of the onboard services.

Providing the high-quality onboard services involves continuous monitoring and maintenance of the services. This may include collecting data about service availability and utilization, data about communications bandwidth, data about connections that are active, dropped and/or recovered, and data indicating problems and anomalies. The collected information may be analyzed to determine, for example, probable causes of the anomalies. The analyzed information may be also used to determine remedial actions for resolving the issues that negatively impact the quality of the onboard services.

Monitoring the onboard network connectivity and inflight entertainment services may be performed by network performance monitoring stations and/or other specialized monitoring entities. The stations and the entities may be operated by airline crews, cruise ship crews, satellite operators, airline control centers, traffic management facilities, and/or vendors responsible for providing the onboard services. The operators may monitor, for example, the utilization of the high-speed Internet communications sessions, utilization of the entertainment session, and the like.

The operators may also monitor time-dependent demands for onboard services as the dynamically changing demands may significantly affect the quality and availability of the services. The operators may monitor, for example, data reflecting the demands for the services during different trips, during different portions of the trips, and during trips scheduled at different times. The operators may also monitor data reflecting the dependencies between the demands, types of the onboard services and durations of the trips.

Furthermore, the operators may monitor location-dependent aspects of the onboard services as those aspects may impact the quality of the services. For example, the operators may monitor data reflecting the dependencies between the quality of the onboard services and relative distances between the aircrafts and the satellites as the aircrafts are en-route.

Since the amounts of the monitored information may be voluminous, presenting the monitored information in a concise and communicative way may directly impact the quality of the onboard services. Since providing the onboard services is not only time-sensitive, but also location-sensitive, the information reflecting the quality of the services may need to be timely and efficiently processed, aggregated and presented to the operators. In fact, the presentation of the information may be needed to ensure that the quality of the onboard services meets the passengers and customers' expectations.

SUMMARY

In some embodiments, a method for obtaining and presenting service performance information about availability and utilization of onboard services in vessels is presented. Examples of the vessels may include aircrafts, helicopters, ships, boats, trains, buses, and the like. Examples of onboard services may include a variety of network communications and entertainment services, such as the Internet access, email and texting support, and broadcasting support for providing news programs, movies, TV shows, and the like.

The method may be used by crew members and vessel operators to monitor availability and utilization of onboard services provided in the vessels. For example, the method may be used by a crew of an aircraft to monitor quality of the communications connectivity and inflight entertainment services provided to the aircraft's passengers. The method may be also used by operators of airline control centers to improve the operations of the aircraft. The method may be also used by the Internet service providers, vendors, and entertainment service providers to monitor availability, utilization and quality of the onboard services provided to vessels via satellites and/or by on-ground communications stations.

In some embodiments, a method for obtaining and presenting service performance information about availability and utilization of onboard services in vessels comprises obtaining time range data. The time range data may indicate a time range for which the performance information is to be provided. The time range may correspond to any time period measured in minutes, hours, days, months, years, or any combination thereof.

The time range data may include a current time indicator. The current time indicator may be later depicted in a visual representation of the service performance information. The indicator may allow to visually distinguish, in the visual representation, the completed trips from the future-scheduled trips for the vessels.

In some embodiments, the method comprises obtaining information about completed trips, ongoing trips, and/or future-scheduled trips within the time range for each of a plurality of vessels. The method may also include obtaining status information of onboard services provided during each trip of the corresponding trips for each vessel. For a completed trip, the status information may include aggregated status information about the availability and utilization of services during the entire trip. For an ongoing trip, the status information may include status information reflecting the last-known service performance data for the trip. For a future-scheduled trip, the status information may include projected status data for the trip.

The status information of the onboard services may include information about various types of services and service characteristics. The information may also include data consumption characteristics, data usage, data session availability, promotional session availability, quality of service (QoS) metrics for the onboard services, and other performance metrics related to the onboard services.

In response to receiving a request for displaying service performance information for the plurality of vessels, first graphical interface data is generated based on the obtained information pertaining to the trips and the onboard service status information for the trips.

In some embodiments, the first graphical interface data represents a plurality of vessel identifiers corresponding to the plurality of vessels. The first graphical interface data may also represent a plurality of trip icons for the corresponding trips for each vessel of the corresponding plurality of vessels. Each trip icon may indicate, for example, a percentage of the communications network connections available during the corresponding trip. The first graphical interface data may also represent a timeline corresponding to the time range.

In some embodiments, the method comprises transmitting, to a display device, the first graphical interface data to cause the display device to generate and to display a trip-schedule viewer representation. The flight-schedule viewer representation may be arranged in many different ways. For example, the representation may have the timeline oriented in a first direction, and the vessel identifiers arranged in a second direction. For each vessel, the plurality of trip icons may be arranged in the second direction according to the vessel identifiers of the corresponding plurality of vessels. Each trip icon may be placed along the first direction according to a corresponding service start time and a corresponding service stop time of an onboard service provided during the corresponding trip.

In some embodiments, an apparatus for obtaining and presenting service performance information about availability and utilization of onboard services in vessels is presented. The apparatus may include one or more processors, one or more memory units in electronic communications with the processors, and instructions that are stored in the memory and that, when executed by the processors, cause the processors to perform the methods described herein.

Additional features and embodiments of the approach for obtaining and presenting information about availability and utilization of onboard services in vessels are described hereinafter. The details and the characteristics of the concepts disclosed herein may be better understood from the following description when considered in conjunction with the accompanying figures. Each of the figures is provided for the illustrative purposes, and not to limit the claims in any way.

BRIEF DESCRIPTION OF THE DRAWINGS

A further understanding of the nature and benefits of the present approaches may be realized in reference to the following drawings. In the appended drawings, similar components or features may have the same reference label. Further, various components of the same type may be distinguished by following the reference label by a second label that distinguishes among the similar components.

In the drawings:

FIG. 4A is an example of a graphical user interface for displaying a trip-schedule viewer.

FIG. 4C is an example of a graphical user interface for displaying additional information about a trip in response to hovering a cursor over a trip icon.

FIG. 4D is an example of a graphical user interface for displaying additional information for a trip in response to selecting a trip icon in a trip-schedule viewer.

DETAILED DESCRIPTION

In the following description, for the purposes of explanation, numerous specific details are set forth in order to provide a thorough understanding of the methods described herein. It will be apparent, however, that the present approaches may be practiced without these specific details. In some instances, well-known structures and devices are shown in a block diagram form to avoid unnecessarily obscuring the present approaches.

1. Example Communications System for Realizing a Trip-Schedule Viewer

Systems and methods are described for obtaining and presenting service performance information about availability and utilization of onboard services in vessels such as aircrafts, ships, trains, buses, and the like. The service performance information may represent availability and utilization of the network communications connections and the inflight entertainment services provided in the vessels to passengers, customers, and/or users. Examples of the communications networks may include the Internet, broadband networks, and the like. Examples of inflight entertainment services may include TV services, movie and news data streaming, and the like. The network connectivity and the entertainment services may be provided to the vessels by communications satellites, Internet-service providers, and other data communications service providers and vendors. The availability and utilization of the onboard services may be monitored using computer servers installed in the vessels and/or on the ground.

Figure 1:
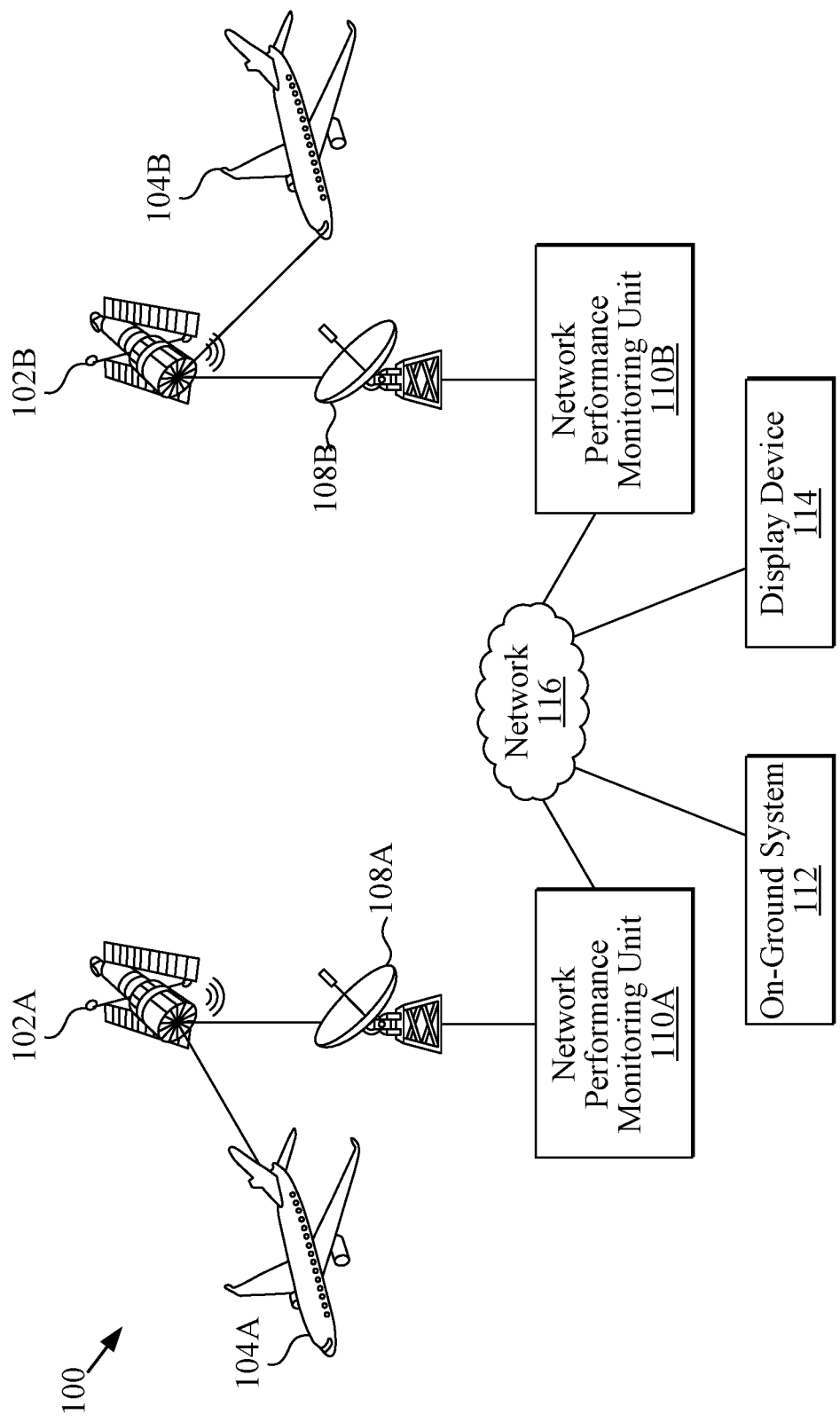
FIG. 1 is a simplified diagram of an example communications system for realizing mechanisms for obtaining and presenting information about availability and utilization of onboard services in vessels.

FIG. 1 is a simplified diagram of an example communications system for realizing mechanisms for obtaining and presenting information about availability and utilization of onboard services in vessels. In the depicted example, communications system 100 comprises one or more communications satellites 102A-102B, one or more vessels 104A-104B, one or more network gateways 108A-108B, one or more network performance monitoring units 110A-110B, one or more on-ground systems 112, one or more display devices 114, and one or more data communications network 116. Other embodiments may include fewer or more components. In some embodiments, communication system 100 supports two-way communications between vessels 104A-104B, gateways 108A-108B, network performance units 110A-110B, network 116, on-ground systems 112, and other components (not shown) of system 100 via an air-to-ground connectivity, or otherwise. Display devices 114 may be configured to display onboard service information for vessels. For example, display device 114 may be configured to generate a graphical user interface for presenting information about availability and utilization of the onboard services in vessels.

Satellites 102A-102B may be configured to provide network communications connectivity to communications systems implemented in vessels 104A-104B, including target devices implemented and/or present in vessels 104A-104B. The target devices may be mobile devices that are operated by the crew and passengers of vessels 104A-104B, and may include smartphones, tablets, iPods, laptops, PDAs, and the like. Satellites 102A-102B may, for example, facilitate network communications to and from the target devices to provide Internet access, TV shows, movies, data news feeds, and the like.

Vessels 104A-104B may be mobile machines that are configured to carry crew members, passengers, and cargo, and to provide communications network connectivity and onboard services. Vessels 104A-104B may be configured to provide, for example, high-speed access to the Internet and/or inflight entertainment to the passengers.

Vessels 104A-104B may include computer systems and sensor systems configured to collect and monitor information about various events reflecting availability and utilization of computer network connectivity and/or inflight entertainment services in vessels 104A-104B. The events may include receiving requests for high-speed Internet connections, data communications sessions, downloading TV programs from content providers, downloading movies from the onboard movie content servers, and the like.

The collected and monitored information may be used by airlines operators, fleet operators, service providers, and vendors to determine performance metrics indicating, for example, QoS metrics showing availability and utilization of the network connectivity and inflight services on individual vessels, individual trips, and/or individual portions of the trips. The QoS metrics may include a web browsing score, a video streaming score, a customer satisfaction score, and the like. The performance metrics may include upload speed metrics, download speed metrics, latency metrics, and the like.

Network gateways 108A-108B may be computer-based systems configured to perform the functionalities of communications modems. The functionalities may include modulation and demodulation of signals communicated between satellites 102A-102B and network performance monitoring units 110A-110B. The functionalities may also include packet queuing, packet acceleration and deceleration, network address translation (NAT), firewall-based security, periodic pinging, and other signal processing functionalities.

Network performance monitoring units 110A-110B may be configured to monitor availability and utilization of network connectivity and inflight entertainment services provided to vessels 104A-104B. The availability and utilization data may be collected by network performance monitoring units 110A-110B themselves, satellites 102A-102B, and/or vessels 104A-104B. The collected data may be processed by any of the monitoring units 110A-110B, on-ground systems 112, satellites 102A-102B, and/or vessels 104A-104B themselves.

Communications network 116 may be implemented as any type of communications network or a group of networks. Network 116 may be configured to provide support for a variety of communications protocols, including broadband protocols, wireless protocols, and the like. Network 116 may support two-way communications between monitoring units 110A-110B, on-ground systems 112, display devices 114, and other computer systems and servers (not shown) implemented in system 100.

2. Example on-Ground System

Figure 2:
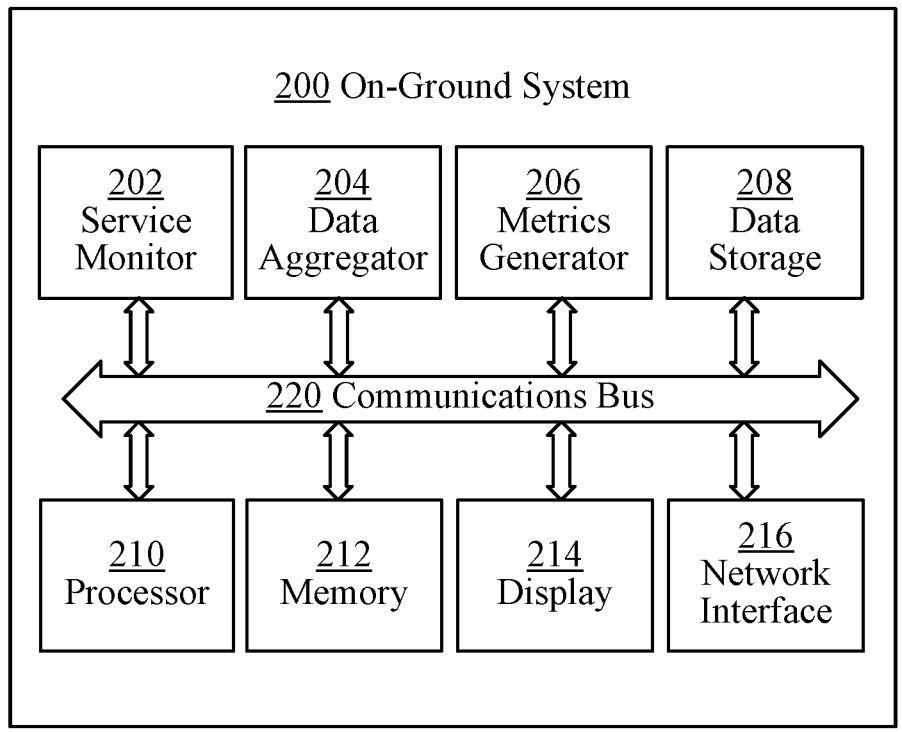
FIG. 2 is a block diagram depicting an example on-ground system for realizing mechanisms for obtaining and presenting information about availability and utilization of onboard services in vessels.

FIG. 2 is a block diagram depicting an example on-ground system for realizing mechanisms for obtaining and presenting information about availability and utilization of onboard services in vessels. On-ground system 200 in FIG. 2 may correspond to on-ground system 112 in FIG. 1. On-ground system 200 may be implemented in a computer server or a network of computer servers, such as cloud-based systems, and/or virtual compute nodes.

In some embodiments, on-ground system 200 is configured to collect, monitor, aggregate, and otherwise process data indicating availability and utilization of onboard services provided in vessels. For example, on-ground system 200 may be configured to obtain vessel identifiers of the vessels for which availability and utilization of onboard services is to be collected and monitored. On-ground system 200 may, for example, request a list of vessel identifiers from an airline control center or from an airport control center. The list of vessel identifiers may be stored by on-ground system 200, and then, the vessel identifiers may be used as search keys in queries issued to request information about the availability and utilization of onboard services provided by the corresponding vessels. For example, a particular vessel identifier may be used as a search key in a query issued to request information about trips scheduled for a corresponding vessel and corresponding start and end times for each of the trips. For each trip, on-ground system 200 may request status information of the onboard services available and utilized on that trip. In other embodiments, these functionalities may be provided by onboard systems implemented in the vessels themselves, or in conjunction with the onboard systems implemented in the vessels.

In some embodiments, on-ground system 200 comprises one or more service monitors 202, one or more data aggregators 204, one or more performance metrics generators 206, and one or more data storage units 208. System 200 may also comprise one or more processors 210, one or more memory units 212, one or more display devices 214, and one or more network interface cards 216. The components of on-ground system 200 may communicate with each other directly or indirectly via a communications bus 220. Other embodiments may include fewer or more components. Display devices 214 may be configured to display onboard service information for vessels. For example, display device 214 may be configured to generate a graphical user interface for presenting information about availability and utilization of the onboard services in vessels.

Service monitor 202 may be configured to collect information about various events associated with availability and utilization of computer network connectivity and/or inflight entertainment services in vessels, shown in FIG. 1. The events may include receiving requests for high-speed Internet connections, data communications sessions, TV programs downloads from content providers, movies downloads from the onboard movie content servers, and the like. The events may also include receiving indications that a high-speed Internet connection was or was not available in a particular vessel at a given time, that a data communications session was or was not successfully opened or closed, that a movie was or was not successfully downloaded to a particular target device in a particular vessel, and the like.

The events may be monitored as passengers aboard a vessel, as the vessel takes off, as the vessel is airborne, as the vessel lands, and/or as the passengers depart the vessel. Service monitor 202 may perform the event monitoring process for each trip (completed and/or in progress), each vessel, each fleet of vessels, each airline, each airport, and the like.

Data aggregator 204 may be configured to process, sort and aggregate the collected and monitored information. The type of processing performed on the data may depend on a variety of factors. For example, if the data pertains to a trip that a vessel has already completed, then the data may be aggregated based on a type of the data, a type of service that the data represents, a source that provided the data, and the like. However, if the data pertains to an ongoing trip, then the processing may include selecting, from the collected data, the most recently received data reflecting the current-up-to-date availability and utilization of the onboard services.

Processed data may be sorted and/or aggregated based on service types, trip identifiers, vessel identifiers, fleet identifiers, airline identifiers, airport identifiers, and the like.

Metrics generator 206 may be configured to use the sorted and aggregated information to determine performance metrics indicating the QoS, availability and utilization of the network connectivity and onboard services provided on individual vessels, individual trips, and/or individual portions of the trips. The metrics may be used to generate graphical representations visually depicting availability and utilization of onboard services in the vessels.

Metrics generator 206 may also be configured to encode the sorted and aggregated data using corresponding status data to reflect availability and utilization of the network connectivity and inflight services provided in vessels. For a given trip, the status may represent, for example, a percentage value indicating the availability of the inflight entertainment services during the given trip. The status data may be determined by metrics generator 206 itself. Alternatively, the status may be provided by satellites 102A-102B, vessels 104A-104B, network gateways 108A-108B, and/or network performance monitoring units 110A-110B, shown in FIG. 1.

Status information and other metrics about availability and utilization of the network connectivity and inflight entertainment services may be stored in data storage 208. Alternatively, or in addition to, the information and the metrics may be communicated to computer servers, such as other ground systems 112, and/or computer servers installed in, for example, vessels 104A-104B. The status information and the metrics may be used to generate, for example, a graphical user interface of a flight-schedule viewer.

Processors 210 may be configured to provide the execution environment for performing various system-based functions and for performing the methods described herein. Processors 210 may be configured to provide, for example, support for executing an operating system and system functionalities implemented in on-ground system 200.

Memory units 212 may include random access memory (RAM) and read-only memory (ROM) units. Memory 212 may be used to store operating system instructions and computer-readable and computer-executable instructions for implementing the methods described herein.

Display 214 may be used to display graphical representations of a trip-schedule viewer, described herein. Examples of the graphical representations generated using display 214 are provided in FIGS. 4A-4D and FIGS. 5A-5C. Display 214 may be implemented as an electronic display, such as a CRT display, LCD display, touchscreen, mobile device screen, and the like.

Network interface card 216 may be configured to facilitate communications between on-ground system 200 and vessels, satellites, network monitoring stations, vessel control centers, vessel operator servers, vendor servers, and the like. The interface may be implemented in hardware, software and/or a combination thereof, and may be implemented to support various communications protocols, including wireless communications protocols, broadband communications protocols, and the like. Network interface 216 may be also used to provide connectivity with input devices (not shown) configured in on-ground system 200. The input devices may include keyboards, touchscreens, audio devices, and the like, and may be used to provide inputs, requests for service performance information of onboard services, and the like.

In some embodiments, components of on-ground system 200 are located within a single location or enclosure. In other embodiments, the components of system 200 may be distributed across multiple locations or enclosures.

3. Example on-Board System

Figure 3:
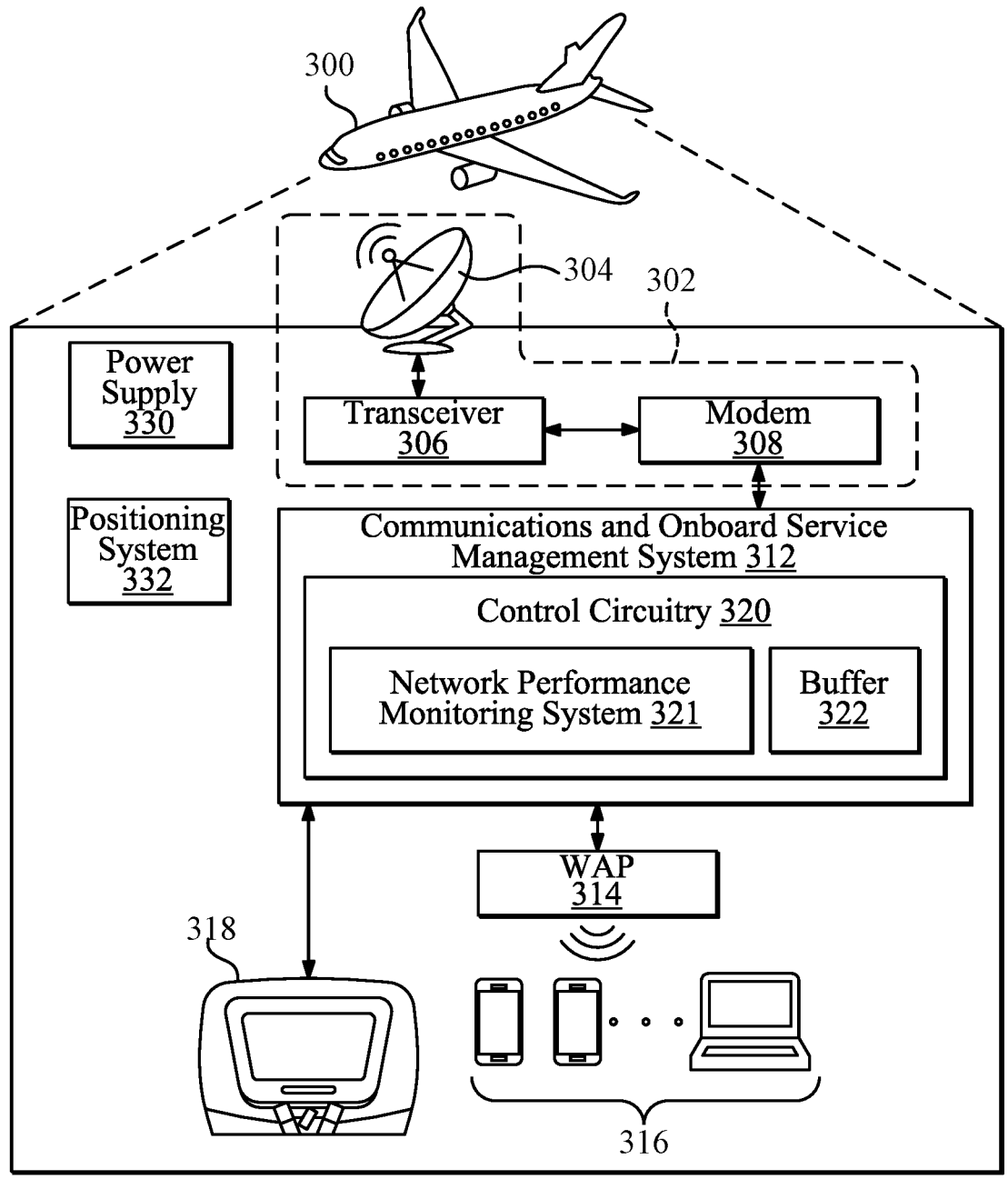
FIG. 3 is a block diagram depicting an example onboard system for realizing mechanisms for obtaining and presenting information about availability and utilization of onboard services in vessels.

In some embodiments, an onboard system of a vessel may be configured to obtain, present, and/or transmit information about availability and utilization of onboard services on the vessel. FIG. 3 is a block diagram depicting an example onboard system for realizing mechanisms for obtaining and presenting information about availability and utilization of onboard services in vessels. The example depicted in FIG. 3 shows an aircraft 300; however, at least some of the components depicted in FIG. 3 may be also implemented in other types of vessels, such as helicopters, cruise ships, and the like. To provide simple examples, it is assumed that the vessel depicted in FIG. 3 corresponds to any vessel 104A-104B, shown in FIG. 1.

In some embodiments, aircraft 300 has associated one or more identifiers. The identifiers may include an aircraft identifier such as a tail number or a vessel ID, a trip number such as a flight number, a travel segment number such as a route number, and the like. The identifiers may be configured, or hard-coded, in a computer system implemented in aircraft 300. The identifiers may also include crew identifiers of crew members of aircraft 300, equipment identifiers such as serial numbers of antennas or network devices, an origination terminal identifier, a destination terminal identifier, a scheduled departure time, a scheduled arrival time, and the like.

In some embodiments, aircraft 300 includes various hardware components, software components, and/or combinations thereof. For example, aircraft 300 may include one or more antennas 304, one or more transceivers 306, one or more modems 308, a communications and onboard service management system 312, one or more wireless access points (WAPs) 314, as well as one or more onboard media clients implemented in one or more personal target devices 316, and/or one or more passenger seatback media systems 318. Aircraft 300 is also equipped with a power supply unit 330 and a positioning system 332.

Antenna 304, transceiver 306, and modem 308 may be collectively referred to as a two-way communication system 302. System 302 may be configured to facilitate bidirectional communications with satellites, such as satellites 102A-102B, shown in FIG. 1.

Communications system 302 may be configured to support bidirectional data communications between communications networks such as the Internet, and target devices 316, seatback media systems 318, positioning system 332, and the like. For example, system 302 may be configured to provide uplink data received from target devices 316 and/or seatback systems 318 to modem 308 to allow generating modulated uplink data in the form of a transmit intermediate frequency (IF) signal. System 302 may also support the reception of a forward downlink signal from a satellite and the transmission of a return uplink signal back to the satellite to support the bidirectional communications. System 302 may operate within the International Telecommunications Union (ITU) Ku, K, or Ka-bands. Alternatively, communication system 302 may operate in other frequency bands such as C-band, X-band, S-band, L-band, and the like.

Antenna 304 may be configured to communicate signals between aircraft 300 and satellites (not shown). The signals may be communicated via one or more communications links (not shown). Antenna 304 may be mounted to an elevation and azimuth gimbal which points antenna 304 toward the satellite and allows actively tracking the satellite.

Modem 308 may be implemented as a separate component, as shown in FIG. 3, or may be integrated with network performance monitoring system 321 of communications and onboard service management system 312. Modem 308 may be configured to generate modulated uplink data based on the uplink data received from communications and onboard service management system 312. The modulated IF signal may be delivered to transceiver 306.

Transceiver 306 may be configured to convert and then amplify the modulated uplink data to generate a return uplink signal and transmit the amplified signal via antenna system 304 to one or more satellites. Transceiver 306 may be also configured to receive, via antenna system 304, a forward downlink signal from the satellites. Transceiver 306 may, for example, amplify and down-convert the forward downlink signal and generate modulated downlink data, such as a receive IF signal, to be then demodulated by modem 308. The demodulated downlink data may be then provided from modem 308 to communications and onboard service management system 312 for routing to target devices 316 and/or seatback systems 318.

Target devices 316 may include smartphones, laptops, tablets, iPods, PDAs, netbooks, and the like, that have been brought onto aircraft 300 by passengers and crew members. Target devices 316 and/or seatback systems 318 may communicate with communications and onboard service management system 312 via communication links (not shown) which may be wired and/or wireless. The communications links may be part of a local area network (LAN) or a wireless area network (WLAN) supported by WAPs 314. WAPs 314 may be installed in various locations of aircraft 300 and may be configured to provide the traffic switching and routing functionalities.

Positioning system 332 may include Global Positioning System (GPS) circuitry, configured to determine a present location or position of aircraft 300. Positioning system 332 may receive positioning information from sensors installed throughout aircraft 300. The position information may include readings of altitude, longitude, latitude, elapsed distance from an origination terminal, and the like. In some embodiments, each position reading is associated with a corresponding time value corresponding to the time at which aircraft 300 was at a particular position, and at which a corresponding position value was recorded.

3.1. Communications and Onboard Service Management System

Communications and onboard service management system 312 may be configured to store, for example, entertainment programs, and to serve the programs to target devices used by the passengers who boarded the vessel. In some embodiments, system 312 may include control circuitry 320 comprising a network performance monitoring system 321 and a data buffer 322. Control circuitry 320 may be configured to perform a variety of functions associated with providing onboard services and collecting and monitoring network performance of the onboard services provided in aircraft 300 by communications system 302 and communications and onboard service management system 312.

In some embodiments, network performance monitoring system 321 is configured to perform a variety of functions associated with monitoring service performance of the onboard services provided in aircraft 300. The functionalities may be similar to those of service monitor 202, data aggregator 204, and/or metrics generator 206, described in FIG. 2. The processed, sorted, and/or aggregated service performance metrics for the onboard services may be stored in buffer 322.

Communications and onboard service management system 312 may be configured to periodically repeat the process of determining values for the metrics described above. Service management system 312 may be also configured to periodically report the metrics to on-ground servers, such as on-ground system 112 described in FIG. 1 or on-ground system 200, described in FIG. 2. In some embodiments, on-ground system 112 may generate and send a query to system 312 requesting system 312 to provide the onboard service status to on-ground system 112. In response to receiving the query, system 312 may collect the information about the availability and utilization of onboard services provided by aircraft 300 and transmit the collected information to on-board system 112. Service management system 312 may be also configured to monitor a location of aircraft 300 and to periodically report the location of aircraft 300 to the on-ground servers.

3.2. Service Performance Data

In some embodiments, communications and onboard service management system 312 is configured to generate service performance data for onboard services and inflight entertainment services provided in aircraft 300 by communication system 302 and/or communications and onboard service management system 312. Service performance data may include information about a count of devices, such as target devices 316 and seatback systems 318, that are present, active and/or failed on board of aircraft 300. The service performance data may also include indicators of the QoS available on the devices. The QoS may be expressed in terms of bandwidth; network connectivity status; error rates; a data transmission rate expressed in, for example, Mbits per second; data flow volume expressed in, for example, an amount of Mbytes of transferred data; a modulation and coding scheme for communications to and from target devices 116 and seatback systems 318; bandwidth information associated with the communications measured in, for example, an available amount of network bandwidth; traffic type information for the traffic associated with the devices; user subscription information associated with the devices (including default subscriptions and premium subscriptions); and the like.

Service performance data may be measured or collected using test protocols. For example, error rates, data rates, and latencies may be determined by having a device connected to the network transmit one or more test packets via the network, having the device receive a response, and then measuring the associated error rate, data rate, and/or latency associated with the transmission and response.

In some embodiments, the service performance data indicates one or more performance metrics. The metrics may include information about a number or average number of dropped packets, average throughput or delays during various time periods, availability of the onboard services during certain time periods, data transmission and retransmission rates, signal quality values, latency measures, packet loss rates, and counts of target devices 316 connected during certain time periods, and the like. In some embodiments, data reflecting availability of the onboard services is represented as a percentage of a certain time period during which a particular onboard service was available to target devices 116, and/or seatback systems 318. In some embodiments, data reflecting the availability of the onboard services indicates the availability of one or more uplink and/or downlink communications.

4. Example Trip-Schedule Viewers

In some embodiments, on-ground computer systems, such as on-ground system 112 in FIG. 1 and/or on-ground system 200 in FIG. 2, are configured to generate and launch a trip-schedule viewer. The trip-schedule viewer may be generated in response to receiving a request to launch the viewer. The request may be received from any type of input device, including a touch screen, a pointer, a mouse, a keyboard, and the like. Examples of input devices may include an input device 714 and a cursor control device 716, described in FIG. 7. A user may provide a request to launch the viewer by selecting, for example, an icon that is displayed on a computer display, such as display device 114 shown in FIG. 1 or display device 214 in FIG. 2, and that is labeled with a label indicting a trip-schedule viewer.

In some embodiments, a trip-schedule viewer is implemented as a graphical user interface (GUI) configured to receive and obtain status information of onboard services in vessels. The information may be obtained from different sources, including network performance monitoring units 110A-110B shown in FIG. 1, on-ground systems 200 shown in FIG. 2, and/or network performance monitoring systems 321 shown in FIG. 3. The GUI may be used to present the status information to operators, crews, vendors, and users to communicate the status information about the onboard services in the vessels as efficiently and clearly as possible. For example, the GUI implementing the trip-schedule viewer may be configured to provide a dynamic, visual, time-based depiction of the onboard services that are being provided by the vessels within a particular time range. The depiction of the onboard services may be organized along a timeline that spans a particular time range. The depiction of the onboard service may be organized per vessel of the plurality of vessels and per trips corresponding to each vessel.

Figure 4A:
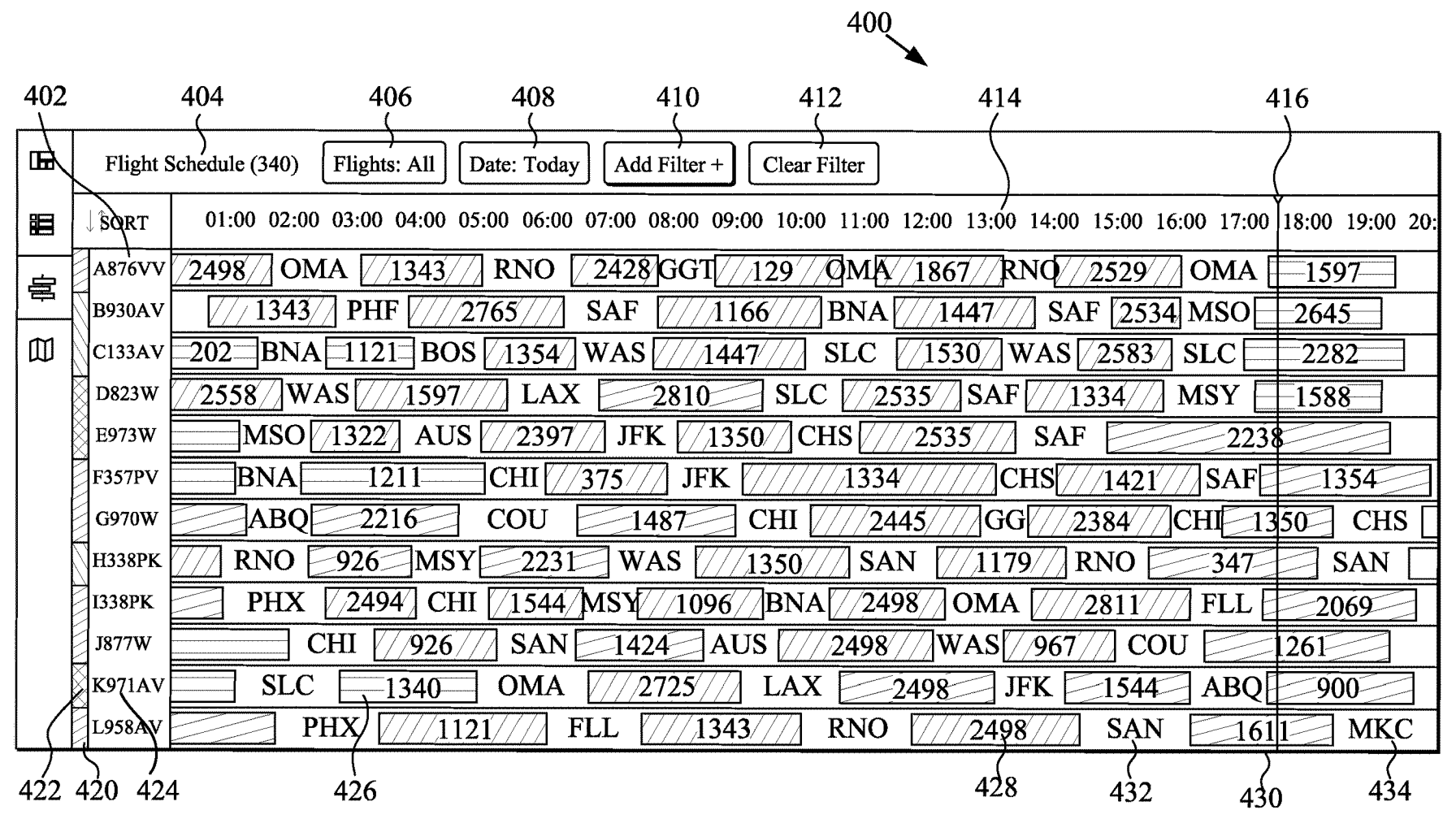

FIG. 4A is an example of a graphical user interface for displaying a trip-schedule viewer. The depicted example shows a snapshot of a two-dimensional graphical representation of a GUI 400 of the trip-schedule viewer. For the clarity of the description, the term graphical representation and the term GUI are used interchangeably throughout the disclosure.

In some embodiments, GUI 400 comprises a plurality of tabs 402, 404, 406, 408, 410 and 412, a timeline 414, a current time indicator 416, and a two-dimensional arrangement of a plurality of vessel identifiers and a plurality of trip icons corresponding to the trips that have been, are, and/or will be conducted by a plurality of vessels within a particular time range. The tabs and the timeline may be arranged, for example, in a horizontal direction, while the vessel identifiers may be arranged, for example, in a vertical direction. Other arrangements in different directions may also be implemented.

In some embodiments, vessel icons corresponding to vessels that belong to different fleets are depicted using different colors. The different fleets may be indicated in GUI 400 using different colors to distinguish the vessels of one fleet from the vessels of another fleet. In the depicted example, the vessels of different fleets are distinguishable using different colors or patterns, such as a color 420 and a color 422.

4.1. Example Timeline Representation

Figure 5A:
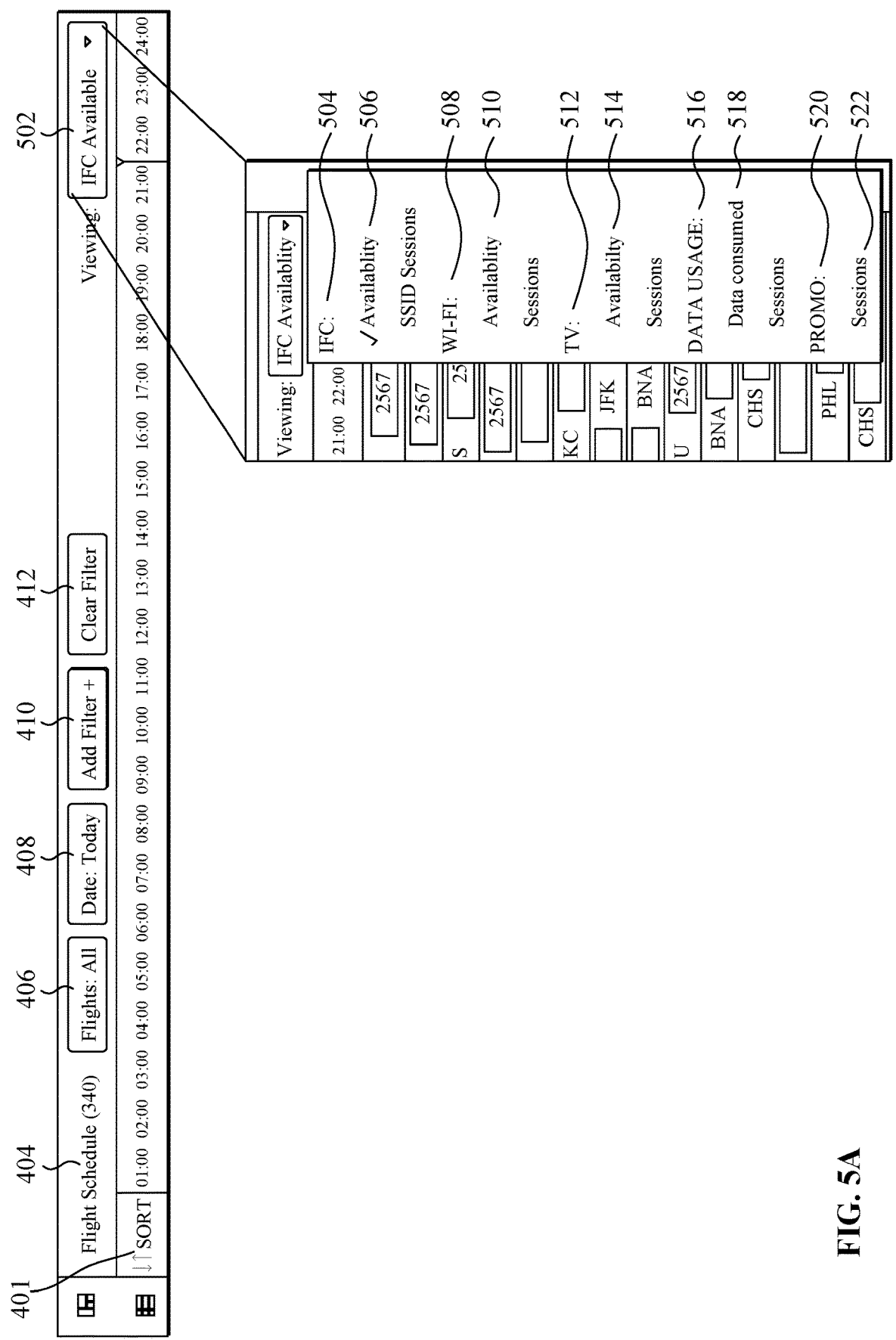
FIG. 5A is an example of a drop-down menu for selecting a particular service of onboard services.
Figure 5B:
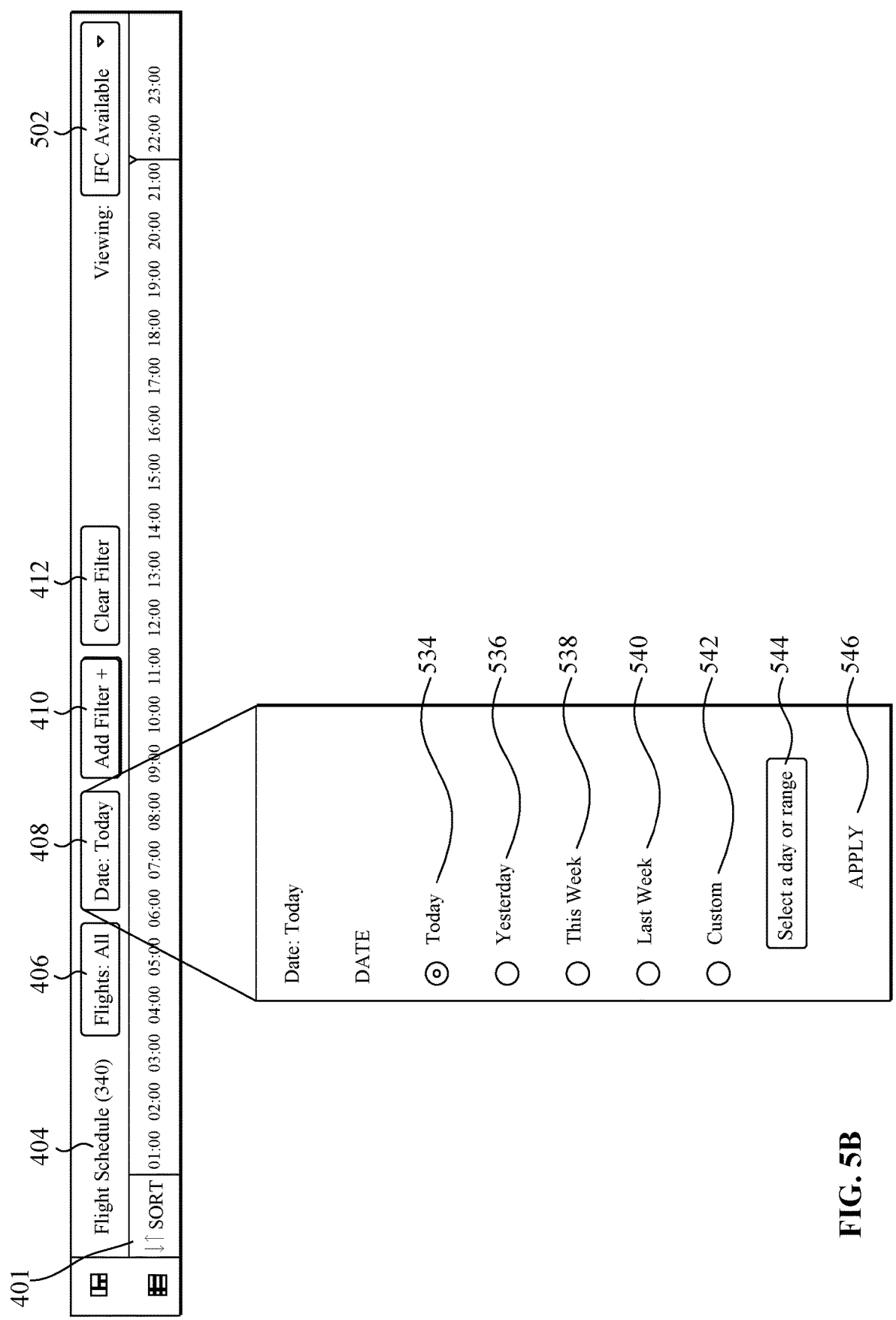
FIG. 5B is an example of a drop-down menu for defining a date and a time range.

Timeline representation 414 may correspond to a time range that may be either set to a default range or customized by a user, as shown in FIG. 5B. For example, a user may define the time range by providing time range data via GUI 400. The time range data may specify any time period for which information about the onboard services is requested. The time period may correspond to any time period measured in minutes, hours, days, months, years, or any combination thereof. Timeline representation 414 may include a starting time and an ending time. Both the starting time and the ending time define the time range for the contents represented in GUI 400.

4.2. Example Trip Icons

The two-dimensional arrangement of GUI 400 may include an arrangement of a plurality of vessel identifiers and the corresponding plurality of trip icons. For each vessel, of the plurality of vessels, the plurality of trip icons may be arranged in the direction according to the plurality of vessel identifiers of the corresponding plurality of vessels. Each trip icon, of the plurality of trip icons, may be placed along a first direction according to a corresponding service start time and a corresponding service stop time of an onboard service provided during the corresponding trip. More specifically, a particular trip icon for a particular vessel may be placed in GUI 400 in a row that is identified by a particular vessel identifier of the particular vessel, and within that row at the location that begins, at the timeline, at a service start time of a corresponding trip and ends at a service end time of the corresponding trip. Therefore, the length of the particular trip icon depicted in GUI 400 corresponds to the time duration between the service start time and the service end time shown along the timeline. Hence, the length of the particular trip icon depicted in GUI 400 corresponds to the length of time of the service on the particular trip. Examples of trip icons include trip icons 426, 428 and 430.

The trip icons displayed in GUI 400 may be labeled with the corresponding trip identifiers (e.g., flight numbers). Since a vessel (e.g., an aircraft) usually completes one trip and starts a next trip at the location (e.g., same airport), the corresponding trip icons may be separated in GUI 400 using a separate icon that is labeled with a code assigned to the corresponding location (e.g., airport). In the illustrated example, the vessels are aircraft and the locations are airports, and trip icons 428 and 430 may be separated by an icon labeled with a code "SAN" which identifies the San Diego International Airport because a corresponding trip 2498 terminated in that airport and a corresponding trip 1611 started at that airport. This type of coding may simplify the labeling of the trip icons. It also saves the label space on the trip icons, as that space may be at the premium; especially when the viewer depicts a multitude of trips.

In the example depicted in FIG. 4A, the vessel identifiers are shown in a vertical column 402. For each vessel identifier, a plurality of trip icons representing the completed, ongoing and/or future scheduled trips are shown horizontally. For example, next to a vessel identifier 424 (showing "K971AV"), several trip icons are displayed corresponding to, for example, a trip 1340 and a trip 2725.

4.3. Example Service Metrics of Trips

In some embodiments, each trip of a plurality of trips has one or more associated service metrics of one or more onboard services. The types and categories of the service metrics may correspond to the types and categories of onboard services available and utilized in vessels during the trips. For example, a trip may have an onboard services availability service metric, an inflight connectivity service metric, a Wi-Fi accessibility service metric, a TV signal service metric, a data usage service metric, a promotional subscription service metric, a handover service metric, and the like.

4.4. Example Values of Service Metrics

Status of service metrics associated with trips may be represented in GUI 400 using corresponding different graphical features. For example, a trip icon corresponding to a trip may have associated one or more features (e.g., a color, a pattern, etc.) that correspond to values (or ranges of values) of service metrics determined (or measured) for the corresponding trip. Each trip icon depicted in GUI 400 may have associated features such as an onboard services availability feature, an inflight connectivity feature, and the like. The depictions of the features may be displayed in GUI 400 as overlays shown, for example, over the trip icons and may be oriented in the same direction as the trip icons. The depictions of the features may be also displayed as pop-up window images representing detailed information pertaining to, for example, the onboard services availability visual feature, the inflight connectivity visual feature, and the like.

In some embodiments, a trip icon corresponding to a trip has a feature indicating whether an open issue has been flagged for a corresponding trip. Open issues may indicate problems that have been experienced/detected during the trip, and/or remedial actions that have been pursued to resolve the problems. Examples of open issues may include an open service order, an open maintenance order, an open part order, and the like.

In some embodiments, trip icons displayed in GUI 400 are selectable. By selecting a trip icon, a user may request a display of additional information associated with the trip icons. The interactivity may include hovering over certain trip icons or selecting certain trip icons within GUI 400. The hovering-based functionality is described in FIG. 4C, while the selecting-based functionality is described in FIG. 4D.

4.5. Example Current Time Indicator

In some embodiments, a trip-schedule viewer displays a current time indicator. A value for the current time indicator may be obtained from on-ground system 112 shown in FIG. 1, or on-ground system 200 shown in FIG. 2. The on-ground system may be configured to obtain the current time value from a computer server and update the value in a real time or a pseudo-real time. The on-ground system may, for example, execute a computer-program called a daemon configured to automatically update the current time value according to the server-system's current time and transmit the updated current time value to the trip-schedule viewer. In some embodiments, GUI 400 includes a depiction of a current time indicator 416. Indicator 416 may indicate a current time, a current date, and the like. Indicator 416 may be depicted as a vertical line that splits the trip icons shown in GUI 400 into three groups: the trip icons that are to the left of indicator 416 correspond to the trips that have been already completed; the trip icons that are intersected by indicator 416 correspond to the trips that are ongoing; and the trip icons that are to the right of indicator 416 correspond to the future scheduled trips. In some embodiments, a portion of GUI 400 shown to the right of indicator 416 is visually distinguished from a portion of GUI 400 shown to the left of indicator 416. For example, the portion may be shaded using a different color or a different pattern.

4.6. Example Color/Pattern Coding

In some embodiments, trip icons displayed in GUI 400 indicate status of onboard services provided by the vessels using one or more features. In some embodiments, features of the trip icons may be colors and/or patterns, and thus the trip icons may be color-coded and/or pattern-coded to indicate the status. The colors/patterns may be selected according to any color/pattern scheme that allows to visually distinguish between different levels of the onboard service performance on the corresponding trips. For example, the trip icons corresponding to the trips on which the service was at least 95% available may be shaded using a green color, the trip icons corresponding to the trips on which the service was no more than 25% available may be shaded using a red color, and the remaining trip icons may be shaded using an orange color. Example legend for an example color/pattern scheme is described in FIG. 4B.

4.7. Example Legend

In some embodiments, trip icons displayed in GUI 400 are color-coded and/or pattern-coded according to a color/pattern scheme that is suitable to visually represent status of onboard services during the trips. The scheme may be described using a legend.

Figure 4B:
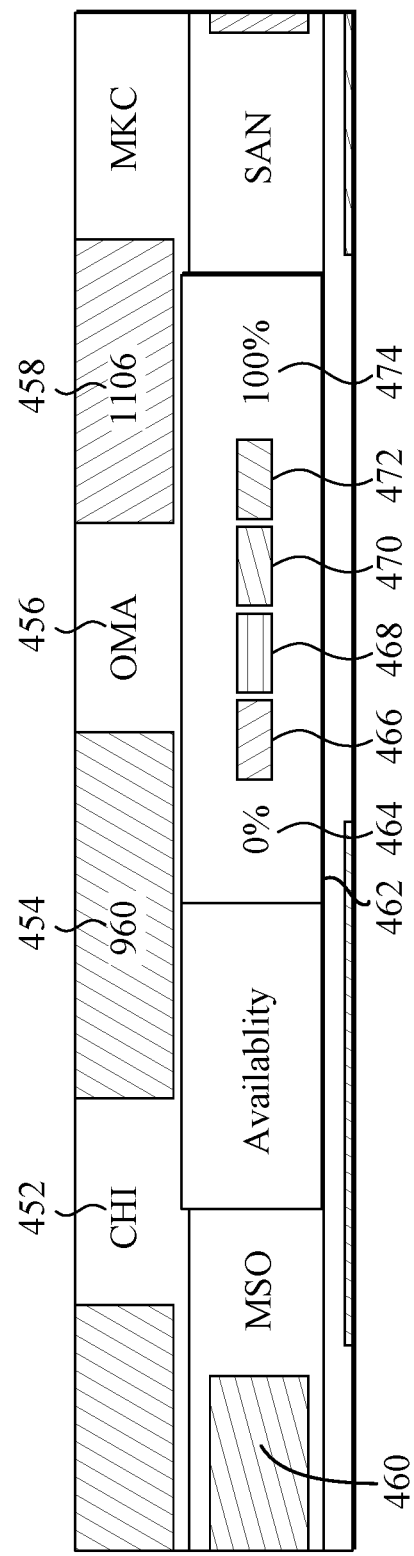
FIG. 4B is an example of a graphical user interface for displaying a legend for a trip-schedule viewer.

FIG. 4B is an example of a graphical user interface for displaying a legend for a trip-schedule viewer. In the depicted example, a legend 462 shows different patterns, each of which is assigned to a different level of availability and usability of the onboard services. In other implementations, a legend may show different colors, each of which is assigned to a different level of the onboard services' availability and usability.

In the depicted example, legend 462 includes legend icons 464-474, trip icons 454, 458 and 460, and airport code icons 452 and 456. Icons 464 and 474 indicate a minimum availability (0%) and a maximum availability (100%), respectively. An icon 466 indicates a pattern/color used to show 0% of the onboard services' availability, and the corresponding pattern/color is shown in trip icon 458. An icon 468 indicates a pattern/color used to show no more than 1% availability. An icon 470 indicates a pattern/color used to show more than 1% but less than 97.5% availability, and the corresponding pattern/color is shown in trip icon 460. An icon 472 indicates a pattern/color used to show at least 97.5% availability, and the corresponding pattern/color is shown in trip icon 454. Other types of legends and pattern/color schemes may also be implemented.

5. Examples of Hovering-Based Interactivity

In some embodiments, trip icons displayed in GUI 400 are interactive. For example, a user may hover a cursor, or any other selecting/pointing element, over a particular trip icon to request additional information of onboard service (during the corresponding trip) expressed as, for example, a percentage shown as an overlay depicted over the particular trip icon. Examples are described in FIG. 4C.

Figure 4C:
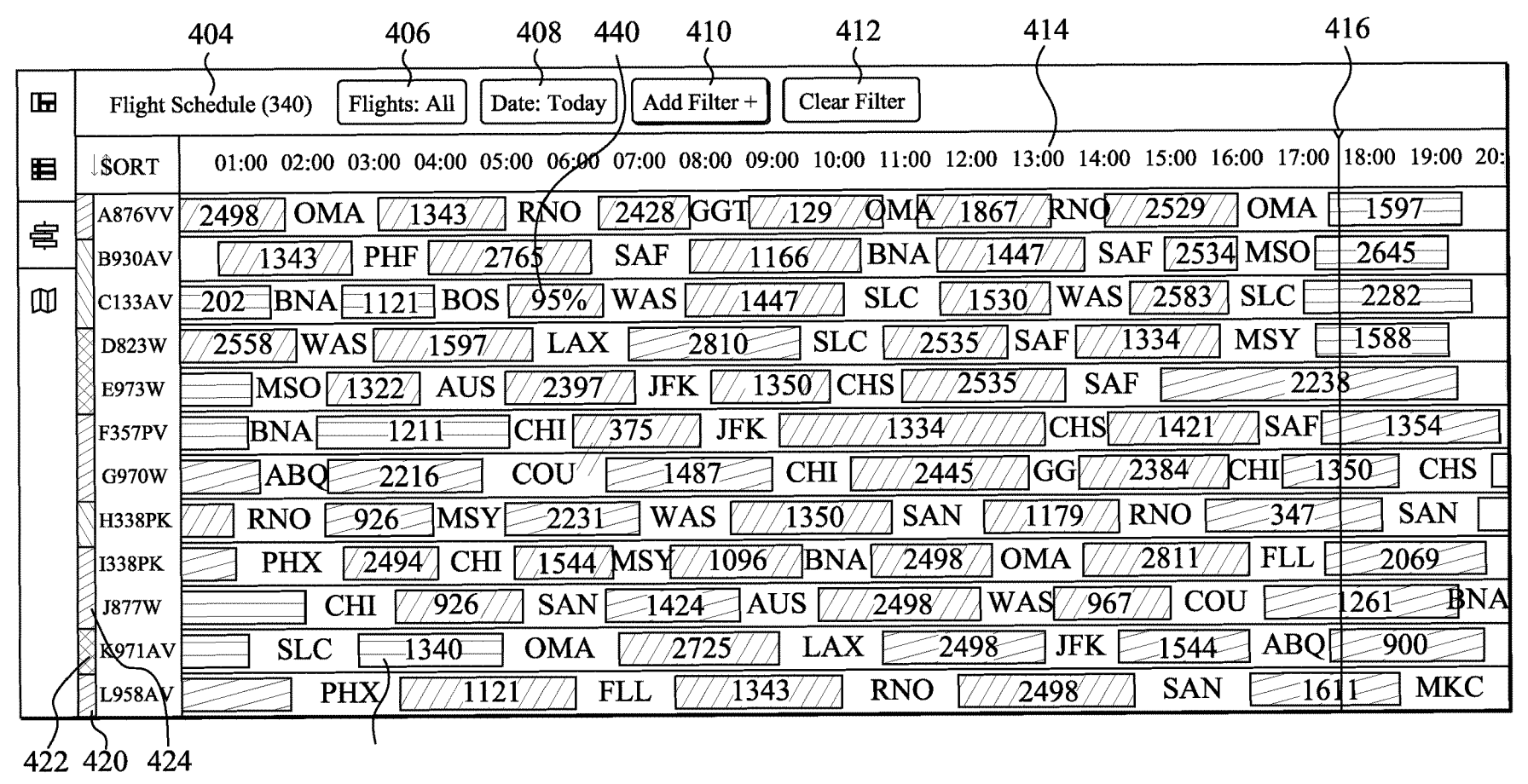

FIG. 4C is an example of a graphical user interface for displaying additional information about a trip in response to hovering a cursor over a corresponding trip icon. In the depicted GUI, a user hovered a cursor, or any other pointing element, over a trip icon 440, corresponding to a particular trip, to request additional information about the particular trip. In response to receiving the request for the additional information about the particular trip, an image depicting a certain feature, associated with the particular trip icon, was obtained and displayed as an overlay shown over trip icon 440 in GUI 400. The additional information may indicate, for example, the availability of the onboard service expressed as a percentage of 95%.

6. Examples of Selection-Based Interactivity

In some embodiments, trip icons displayed in GUI 400 are selectable. For example, a user may select (i.e., click on) a trip icon, corresponding to a particular trip, to request additional, onboard-specific information for the corresponding trip. Examples are described in FIG. 4D.

Figure 4D:
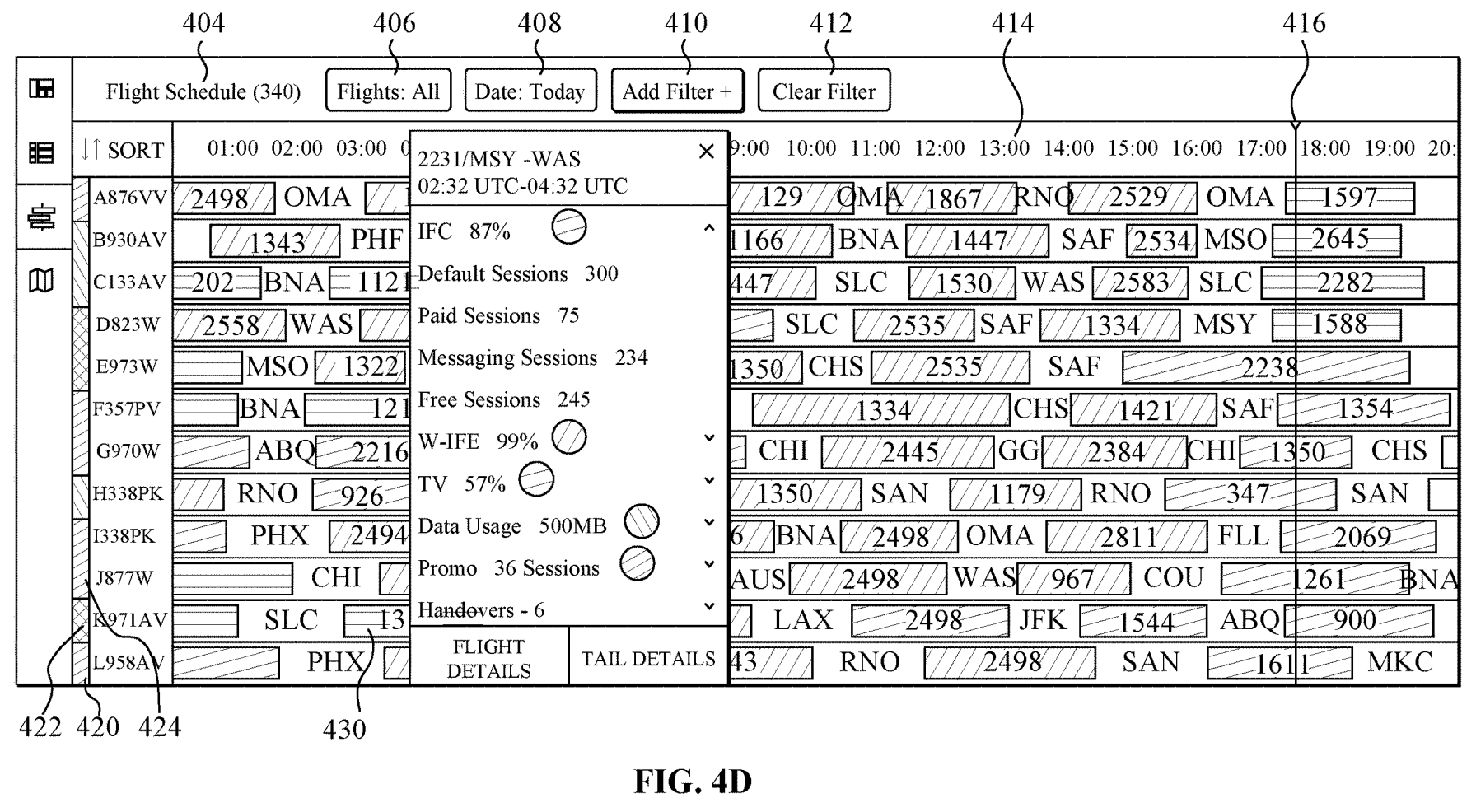

FIG. 4D is an example of a graphical user interface for displaying additional information for a trip in response to selecting a trip icon in a trip-schedule viewer. In the depicted GUI, a user selected a trip icon 430 to request additional, trip-specific information pertaining to a particular trip. In response to receiving the request for the additional, flight-specific information for the particular trip, a pop-window representation of certain features associated with the particular trip icon was generated and displayed as an overlay over GUI 400. The pop-window representation may include, for example, information about an inflight connectivity availability, a count of default sessions, a count of paid sessions, a count of messaging sessions, a count of free sessions, a Wi-Fi availability, a TV signal availability, a data usage, a count of promotional subscriptions, and count of handovers, and the like.

In some embodiments, a pop-window representation of features associated with a trip icon includes additional selection buttons. The selection buttons may allow requesting flight details for the trip and/or requesting tail details of a vessel conducting the trip. In response to selecting any of the selection buttons, the requested information may be displayed in another pop-up window in GUI 400.

7. Examples of Viewer Customization Options

In some embodiments, each trip of a plurality of trips has one or more associated service metrics of one or more onboard services. Hence, a trip may have, for example, an onboard services availability service metric, an inflight connectivity service metric, a Wi-Fi accessibility service metric, a TV signal service metric, a data usage service metric, a promotional subscription service metric, a handover service metric, and the like. Subsequently, each trip icon may have associated one or more features that correspond to the service metrics associated with the corresponding trip.

In some embodiments, GUI 400 is customized by specifying the types of features that are to be displayed in GUI 400. The customization is typically enabled by providing interactive tabs which, when selected, allow generating and displaying, for example, corresponding drop-down menus providing various customization options. Examples of different customization options are described in FIG. 5A-5C.

FIG. 5A is an example of a drop-down menu for selecting a particular service of onboard services. In the depicted example, interactive tabs may include a sorting tab 401, a trip-schedule viewer identifier tab 404, a flight selection tab 406, a date customization tab 408, a filter customization tab 410, a filter clearing tab 412, and service performance type selection tab 502. Other embodiments may include fewer or more tabs.

7.1. Example Onboard Service Type Customization

The example depicted in FIG. 5A shows an interactive tab 502 which, when selected, allows choosing one or more different onboard services which are available/utilized in vessels and for which service performance data is to be displayed in GUI 400. A user may select (i.e., click on) tab 502 to request generating and launching an interactive drop-down menu that allows selecting a particular onboard service available during the trips. Upon selecting tab 502, the interactive menu is generated and displayed in GUI 400.

In FIG. 5A, the menu includes the following options: an IFC option 504 (which may include an IFC availability option 506 and a SSID sessions option), a Wi-Fi option 508 (which may include an availability option 510 and a sessions option), a TV option 512 (which may include an availability option 514 and a sessions option), a data usage option 516 (which may include a data consumed option 518 and a sessions option), and a promo option 520 (which may include a sessions option 522). In other embodiments, fewer or more options may be implemented.

In response to selecting, from the menu, a particular onboard service, new graphical interface data may be generated to reflect the status information of the particular onboard service available and/or utilized during the trips.

Based on the new graphical interface data, GUI 400 is updated to graphically indicate the status information of the particular onboard service.

7.2. Example Date and Time Range Customization

FIG. 5B is an example of a drop-down menu for defining a date and a time range. The depicted example shows an interactive tab 408 which, when selected, allows defining a date and/or a time range for presenting information about onboard services in GUI 400.

Selecting tab 408 allows selecting, for example, a today date, a future date, or a past date. Selecting tab 408 may also allow modifying the time range for which the onboard service information may be provided.

In the depicted example, a user may select tab 408 to request generating and launching an interactive drop-down menu that allows entering a date or a time period for the scope of data displayed in GUI 400. Upon selecting tab 408, the interactive menu is generated and displayed in GUI 400. The menu may provide, for example, an option 534 for selecting a today date, an option 536 for selecting a yesterday date, an option 538 for selecting a this-week time range, an option 540 for selecting a last-week time range, an option 542 for selecting a custom time range option, and the like. A custom time range text box 544 may allow entering a custom time range. Once the custom date or the custom time range is provided, a user may select an apply option 546, to confirm the selection, and to cause generating new contents for the selected date and/or selected time range. The generated content may be displayed in GUI 400.

7.3. Example Sorting

In some embodiments, tab 401 is used to sort contents displayed in GUI 400. The sorting may be performed according to, for example, vessel identifiers, tail identifiers assigned to the vessels, fleet types, fleet identifiers, and the like. Sorting tab 401 may be used to, for example, sort vessel identifiers first, and subsequently to sort the contents displayed in GUI 400 according to the sorted vessel identifiers. Tab 401 may also allow ordering the identifiers displayed in the viewer either in an ascending order or a descending order. Examples are described in FIG. 5C.

Figure 5C:
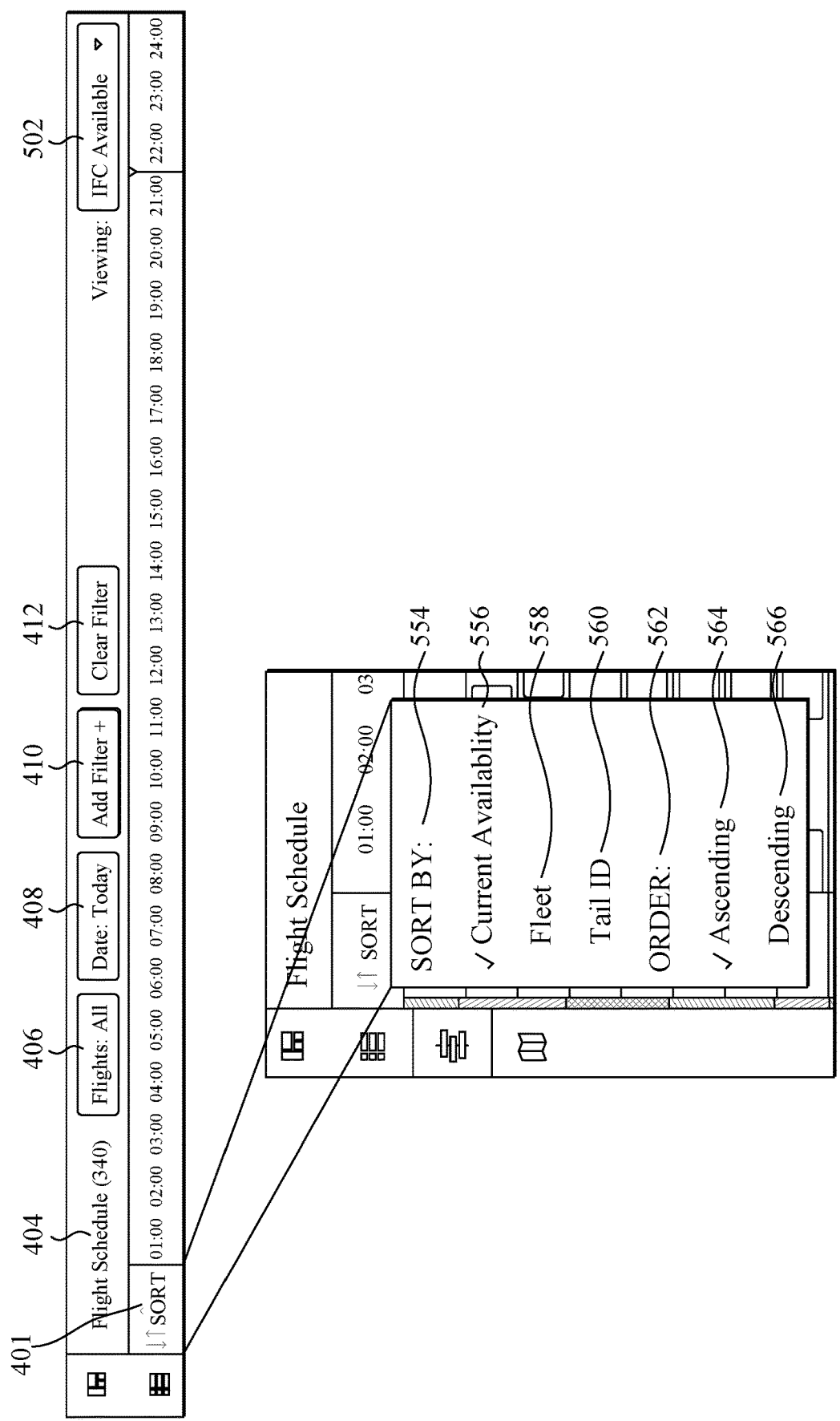
FIG. 5C is an example of a drop-down menu for defining a sorting type and a sorting order.

FIG. 5C is an example of a drop-down menu for defining a sorting type and a sorting order. In the depicted example, a user selected tab 401 to request generating and launching an interactive drop-down menu that allows sorting and/or rearranging the information in GUI 400. Upon selecting tab 401, an interactive drop-down menu is generated and displayed in GUI 400. The menu may provide several sorting options 554 for sorting, for example, the vessel identifiers and the corresponding contents. The options may include, for example, an option 556 to sort the vessel identifiers by their current availability, an option 558 to sort the vessel identifiers by a fleet, an option 560 to sort the vessel identifiers by a tail identifier, and the like. The tail identifiers are unique, and thus may be used to sort any plurality of vessel identifiers displayed in GUI 400. The different fleets may be indicated in GUI 400 using different colors to distinguish the vessels of one fleet from the vessels of another fleet.

The menu may also provide ordering options 562, including an ascending ordering option 564 to order the vessel identifiers displayed in the trip-schedule viewer in an ascending order, and a descending ordering option 566 to order the vessel identifiers in a descending order.

7.4. Example Viewer Identification

Trip-schedule viewer identifier tab 404, shown for example in FIG. 5C, may be used to identify GUI 400 or an application product used to generate GUI 400. Tab 404 may be also used to provide information about, for example, a total count of trips displayed in GUI 400. In the depicted example, tab 404 indicates that GUI 400 was generated using a Flight Schedule application, and a total count of trips depicted in GUI 400 is 340. In some embodiments, tab 404 is implemented as a toggle and may control a successive display of various information about the viewer and the application as tab 404 is successively selected.

7.5. Example Flight Selection

Flight selection customization tab 406, shown for example in FIG. 5C, may be implemented as an interactive tab and may be used to launch an interactive drop-down menu for selecting flights for which the onboard service information may be provided. Selecting tab 406 allows selecting, for example, the flights that are completed, the flights that are ongoing, or the future-scheduled flights within the time range. Selecting tab 404 may also allow selecting a particular group of flights, the flights departing from a particular destination, the flights arriving at a particular destination, the flights provided by a particular airline, and the like.

7.6. Example Filter Selection

Filter customization tab 410, shown for example in FIG. 5C, may be implemented as an interactive tab. It may include additional filters to be used to determine the scope of the data displayed in GUI 400. Selecting tab 410 may allow selecting, for example, fleets, aircrafts, airlines, airports, and/or satellites (or satellite monitoring units or centers) for which the onboard service information is sought. Other types of filters may also be implemented. The filters may be cleared by selecting, for example, tab 412, or selecting another special icon (not shown).

7.7. Example Filter Clearing

Filter clearing tab 412, shown for example in FIG. 5C, may be implemented as an interactive tab for clearing the filters selected using, for example, tab 410.

8. Example Flow Chart

Figure 6:
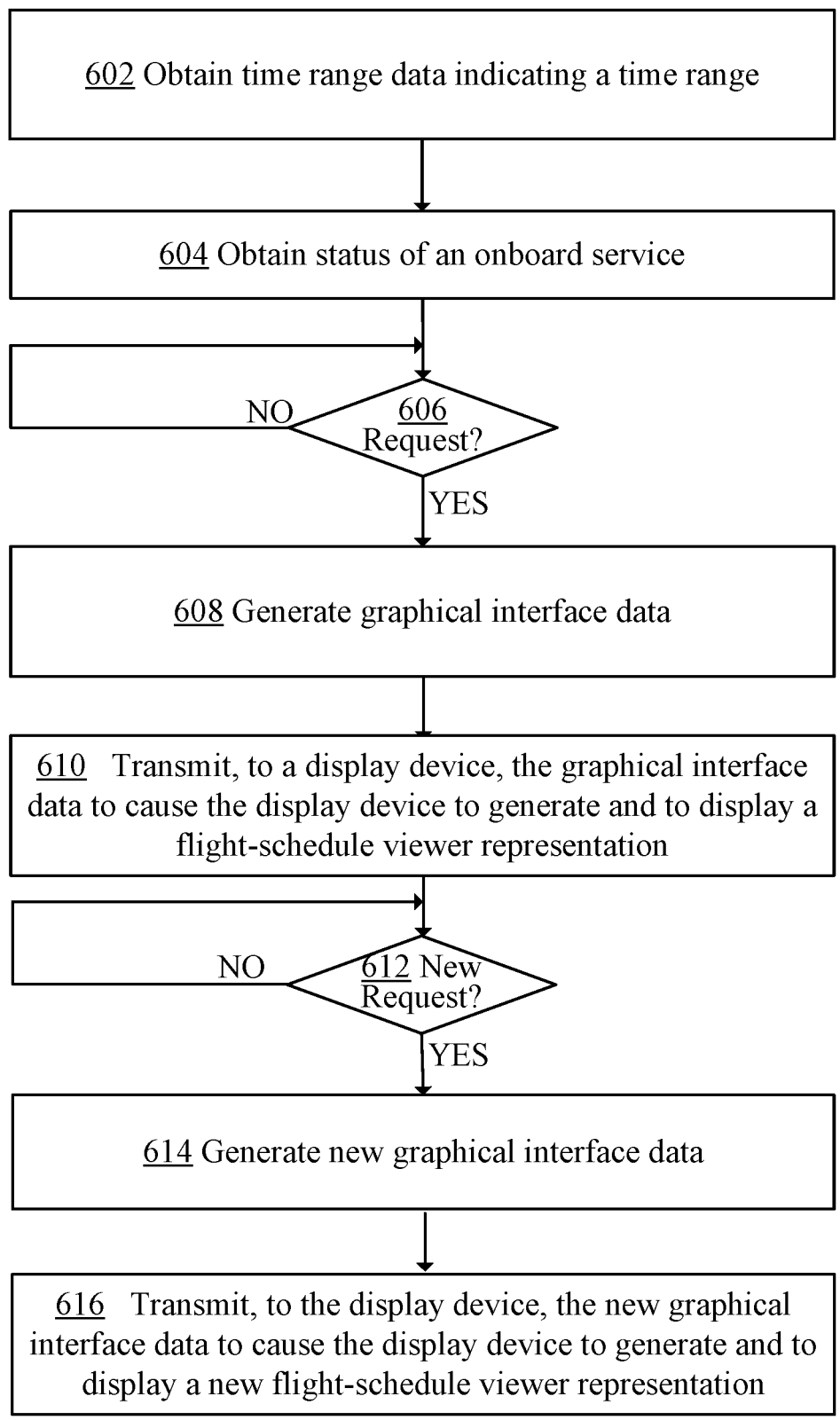
FIG. 6 is an example flow chart for an approach for obtaining and presenting information about availability and utilization of onboard services in vessels.

FIG. 6 is an example flow chart for an approach for obtaining and presenting information about availability and utilization of onboard services in vessels. The approach may be implemented in an on-ground server, an onboard server, and any other server or a computer system configured to communicate with vessels, service providers, and vendors. For the clarity of the description, the steps described in FIG. 6 are implemented in a process executed in a server; however, this should not be viewed as limiting the approach in any way.

In step 602, a process obtains time range data. The time range data may indicate a time range for which the information is sought. The time range may correspond to any time period measured in minutes, hours, days, and/or any combination thereof. The time range may be set by default and/or may be set or modified by an operator or a user.

In some embodiments, an indication of the time range is received from a user via an input device such as a keyboard or microphone. In some embodiments, the time range includes a starting time, an ending time, a starting date, an ending date, or any combination thereof. In some embodiments, the time range includes a month, a year, a season, a calendar quarter, or any other type of time range, or any combination.

The time range may include a current time indicator that may be used to visually distinguish the already completed trips, from the ongoing trips, and from the future-scheduled trips.

In step 604, the process obtains, for each of the plurality of vessels, information about the completed trips, the ongoing trips, and/or the future-scheduled trips within the time range. In this step, the process also obtains status information of an onboard service provided during each trip of the corresponding trips for each of the plurality of vessels. For a completed trip, the status information may include the aggregated status information about the services' availability and utilization during the entire trip. For an ongoing trip, the status information may include the status information reflecting the last-known service performance data for the trip.

In some embodiments, the status information includes a plurality of network metric values for each of network communication metrics determined for onboard services provided in vessels. Examples of the metrics have been described in detail above.

In step 606, the process determines whether a request for service performance information has been received. If the server determines that a request has been received, then step 608 is performed. Otherwise, step 606 is performed. Alternatively, not shown in FIG. 6, the server obtains new or updated range data and/or new or updated status information of the onboard services.

In step 608, the process generates the first graphical interface data. The first graphical interface data is generated based on the already obtained information pertaining to the trips and the status information of the onboards services during the corresponding trips.

The first graphical interface data may represent a plurality of vessel identifiers, wherein the identifiers correspond to the plurality of vessels. The first graphical interface data may also represent a plurality of trip icons for the corresponding trips for each of the corresponding plurality of vessels. Each trip icon may have at least one feature. A feature may indicate the status of the onboard service available and/or utilized during the corresponding trip.

The first graphical interface data may also represent a timeline corresponding to the time range. For example, if the time range includes a 24-hour-long time period, and the plurality of vessels includes ten vessels, then the first graphical interface data may include ten vessel identifiers, and, for each vessel of the ten vessels, one or more trip icons corresponding to the completed, ongoing and future-scheduled trips.

In step 610, the process transmits, to a display device, the first graphical interface data to cause the display device to generate and to display a flight-schedule viewer representation. The trip-schedule viewer may be arranged in many different ways. For example, the viewer may have the timeline arranged in a horizontal direction, and the plurality of vessel identifiers arranged in a vertical direction. For each vessel, of the plurality of vessels, the plurality of trip icons may be arranged in the vertical direction according to the plurality of vessel identifiers of the corresponding plurality of vessels. Each trip icon, of the plurality of trip icons, may be placed along the horizontal direction according to a corresponding service start time and a corresponding service stop time of an onboard service provided during the corresponding trip.

In step 612, the process determines whether a new request has been received. The new request may pertain to requesting additional information for a particular trip, requesting service performance information for a particular service of a plurality of onboard services provided by the vessels, requesting a new sorting order, requesting a particular filter, modifying the time range, and the like.

If the new request has been received, then the server proceeds to perform step 614. Otherwise, step 612 is repeated. Alternatively, although not depicted in FIG. 6, the process may proceed to step 602 and receive new or updated time range data.

In step 614, the process parses the new requests, and based on the parsed information determines and generates new graphical interface data.

In step 616, the process transmits, to the display device, the new graphical interface data to cause the display device to generate and to display a new trip-schedule viewer representation. The new trip-schedule viewer may include a display of the additional information for a particular trip (as shown in FIG. 4C-4D), or customization options (as shown in FIG. 5A-5C).

9. Example Implementation Mechanisms

An implementation of the disclosed approach may encompass performance of a method by a computing system having one or more processors and storage media. The one or more processors and the storage media may be provided by one or more computer systems, and not necessarily by the same computer system. The storage media of the computing system may store one or more computer programs. The one or more programs may include instructions configured to perform the method. The instructions may also be executed by the one or more processors to perform the method.

An implementation of the disclosed approach may encompass one or more non-transitory computer-readable media. The one or more non-transitory computer-readable media may store the one or more computer programs that include the instructions configured to perform the methods disclosed herein.

An implementation of the disclosed approach may encompass the computing system having the one or more processors and the storage media storing the one or more computer programs that include the instructions configured to perform the method.

An implementation of the disclosed approach may encompass one or more virtual machines that operate on top of one or more computer systems and emulate virtual hardware. A virtual machine can be implemented by, for example, a Type-1 or Type-2 hypervisor. Operating system virtualization using containers is also possible, and may be implemented in conjunction with, for example, hardware virtualization utilizing the hypervisors.

For an implementation that encompasses multiple computer systems, the computer systems may be arranged in a distributed, parallel, clustered or other suitable multi-node computing configuration. The computer systems may be continuously, periodically, or intermittently interconnected by one or more data communications networks (e.g., one or more internet protocol (IP) networks.) The set of computer systems that execute the instructions may be the same set of computer systems that provide the storage media storing the one or more computer programs, and the computer systems may only partially overlap or may be mutually exclusive. For example, one set of computer systems may store the one or more computer programs from which another, different set of computer systems downloads the one or more computer programs and executes the instructions thereof.

Figure 7:
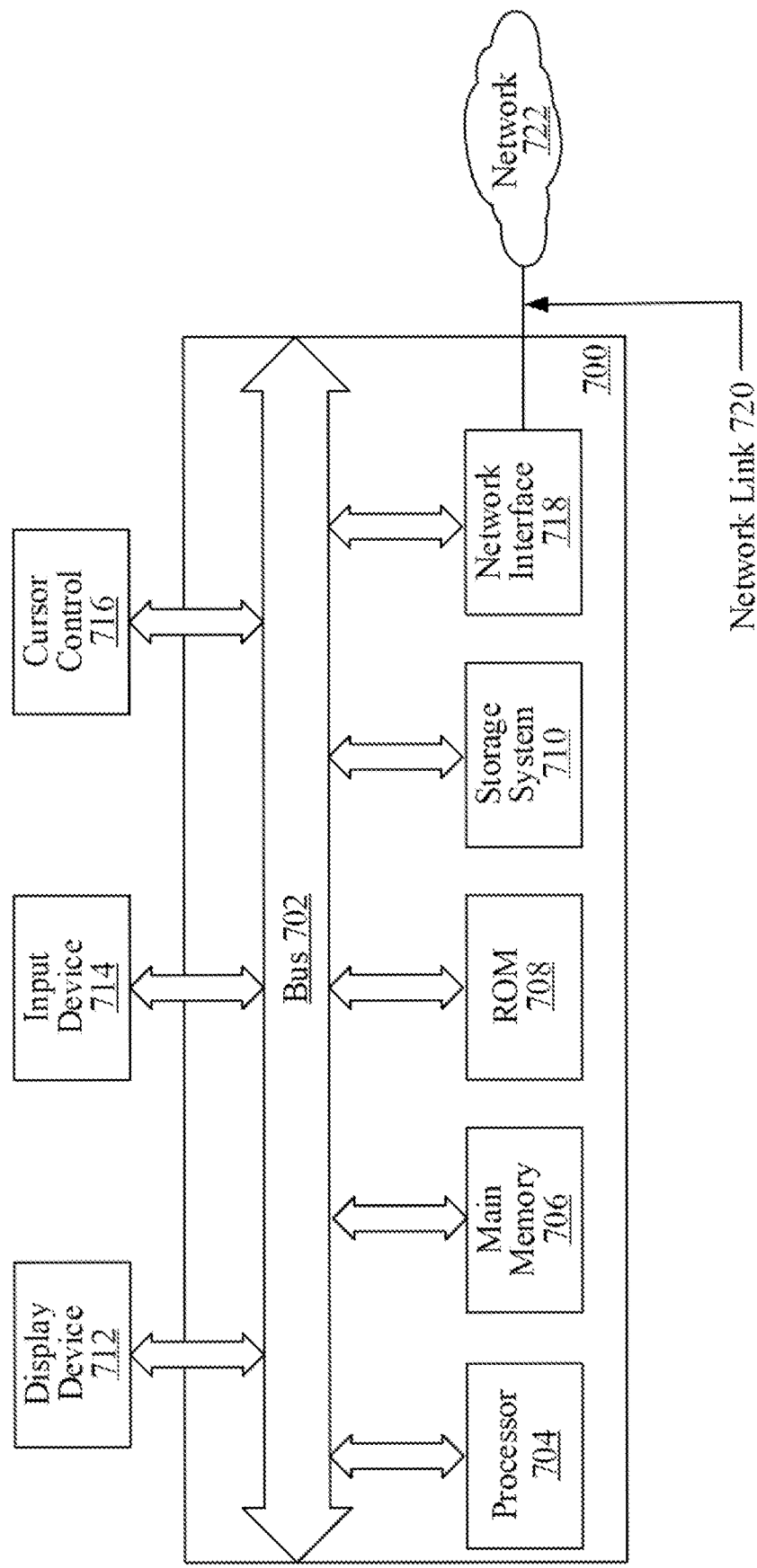
FIG. 7 is a block diagram of an example computer system used in an implementation of the disclosed approach.

FIG. 7 is a block diagram of an example computer system used in an implementation of the disclosed approach. Computer system 700 may be configured to implement the approach for obtaining and presenting information about availability and utilization of onboard services in vessels. In some embodiments, computer system 700 includes bus 702 or other communication mechanism for communicating information, and one or more hardware processors coupled with bus 702 for processing information.

Hardware processor 704 may be, for example, a general-purpose microprocessor, a central processing unit (CPU) or a core thereof, a graphics processing unit (GPU), or a system on a chip (SoC).

Computer system 700 also includes a main memory 706, typically implemented by one or more volatile memory devices, coupled to bus 702 for storing information and instructions to be executed by processor 704. Main memory 706 also may be used for storing temporary variables or other intermediate information during execution of instructions by processor 704. For example, main memory 706 may be used to store service performance information about availability and utilization of onboard service in vessels.

Computer system 700 may also include read-only memory (ROM) 708 or other static storage device coupled to bus 702 for storing static information and instructions for processor 704.

A storage system 710, typically implemented by one or more non-volatile memory devices, is provided and coupled to bus 702 for storing information and instructions.

Computer system 700 may be coupled via bus 702 to display device 712, such as a liquid crystal display (LCD), a light emitting diode (LED) display, or a cathode ray tube (CRT), for displaying information to a computer user. Display device 712 may be configured to display onboard service information for vessels. For example, display device 712 may be configured to generate a graphical user interface for presenting information about availability and utilization of the onboard services in vessels. Display device 712 may be combined with a touch sensitive surface to form a touch screen display. The touch sensitive surface may be an input device for communicating information including direction information and command selections to processor 704 and for controlling cursor movement on display device 712 via touch input directed to the touch sensitive surface such by tactile or haptic contact with the touch sensitive surface by a finger or a hand, or by a hand-held stylus or pen. The touch sensitive surface may be implemented using a variety of different touch detection and location technologies including, for example, resistive, capacitive, surface acoustic wave (SAW) or infrared technology.

Input device 714, including alphanumeric and other keys, may be coupled to bus 702 for communicating information and command selections to processor 704. Input device 714 may be used to, for example, provide time range data that indicates a time range for which service performance information about availability and utilization of onboards services in vessels is requested.

Another type of user input device may be cursor control 716, such as a mouse, a trackball, or cursor direction keys for communicating direction information and command selections to processor 704 and for controlling cursor movement on display 712. This input device typically has two degrees of freedom in two axes, including a first axis (e.g., x) and a second axis (e.g., y), that allow the device to specify positions in a 2D plane.

Instructions, when stored in non-transitory storage media accessible to processor 704, such as, for example, main memory 706 or storage system 710, render computer system 700 into a special-purpose machine that is customized to perform the operations specified in the instructions. Alternatively, customized hard-wired logic, one or more ASICs or FPGAs, firmware and/or hardware logic which in combination with the computer system causes or programs computer system 700 to be a special-purpose machine.

A computer-implemented process may be performed by computer system 700 in response to processor 704 executing one or more sequences of one or more instructions contained in main memory 706. Such instructions may be read into main memory 706 from another storage medium, such as storage system 710. Execution of the sequences of instructions contained in main memory 706 causes processor 704 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 710) and/or volatile media (e.g., main memory 706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 702. Transmission media can also take the form of acoustic or light waves, such as those generated during radio-wave and infra-red data communications.

Computer system 700 may also include a network interface 718 coupled to bus 702. Network interface 718 provides a two-way data communications-coupling to a wired or wireless network link 720 that is connected to a local, cellular or mobile network 722. For example, communication interface 718 may be IEEE 702.3 wired "ethernet" card, an IEEE 702.11 wireless local area network (WLAN) card, an IEEE 702.15 wireless personal area network (e.g., Bluetooth) card or a cellular network (e.g., GSM, LTE, etc.) card to provide a data communication connection to a compatible wired or wireless network. In an implementation, communication interface 718 sends and receives electrical, electromagnetic or optical signals that carry digital data streams representing various types of information.

Network link 720 typically provides data communication through one or more networks to other data devices. For example, network link 720 may provide a connection through network 722 to local computer systems that is also connected to network 722 or to data communication equipment operated by, for example, network access providers.

Networks may use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network 722, network link 720 and communication interface 718. The received code may be executed by processor 704 as it is received, and/or stored for later execution in storage device 710, or other non-volatile storage. For example, processor 704 may be configured to execute instructions for requesting and obtaining information about completed trips, ongoing trips, and/or future-scheduled trips within the time range for each of a plurality of vessels. Processor 704 may also execute instructions for obtaining status information of onboard services provided during each trip of the corresponding trips for each vessel.

10. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A method for displaying onboard service information for vessels, the method comprising:
   obtaining time range data indicating a time range;
   obtaining corresponding trips within the time range for each of a plurality of vessels;
   obtaining status of a plurality of onboard services provided during each trip of the corresponding trips for each of the plurality of vessels;
   in response to receiving a request for displaying service performance information for the plurality of vessels:
      generating first graphical interface data representing:
         a plurality of vessel identifiers that corresponds to the plurality of vessels;
         a plurality of trip icons for the corresponding trips for each of the plurality of vessels, wherein at least one feature of each trip icon of the plurality of trip icons includes a status indicator feature that indicates an aggregated availability and utilization metric of the plurality of onboard services provided during the corresponding trip, the aggregated availability and utilization metric comprising a status value based on an aggregation of availability and utilization metrics of individual ones of the plurality of onboard services;
         a timeline that represents the time range; and
         a plurality of pop-windows for the corresponding trips for each of the plurality of vessels, the plurality of pop-windows comprising the availability and utilization metrics for the individual ones of the plurality of onboard services for the corresponding trips for each of the plurality of vessels; and
      transmitting, to a display device, the first graphical interface data to cause the display device to generate and to display a trip-schedule viewer representation that comprises:
         the timeline arranged in a first direction;
         the plurality of vessel identifiers arranged in a second direction;
         the plurality of trip icons for the corresponding trips for each of the plurality of vessels including each corresponding status indicator feature, wherein the plurality of trip icons is arranged in the second direction according the plurality of vessel identifiers that corresponds to the plurality of vessels, and wherein each trip icon of the plurality of trip icons is further placed along the first direction according to a corresponding service start time and a corresponding service stop time of the onboard service provided during the corresponding trip; and
         wherein upon selecting a trip icon of the plurality of trip icons, a corresponding pop-window of the plurality of pop-windows is displayed.

2. The method of claim 1, wherein the status indicator feature of the onboard service provided during a completed trip, of the corresponding trips, includes information about the plurality of onboard services provided during an entire duration of the completed trip; and
   wherein the status indicator feature of the plurality of onboard services provided during an ongoing trip, of the corresponding trips, includes a last-known service performance status for the ongoing trip corresponding to the aggregated availability and utilization metric of the plurality of onboard services provided to a current time.

3. The method of claim 1, wherein:
   the time range data includes a current time indicator;
   the current time indicator is graphically depicted in the trip-schedule viewer representation as a line segment oriented in the second direction; and
   the current time indicator visually separates, in the trip-schedule viewer representation, completed trips from future-scheduled trips.

4. The method of claim 1, wherein the trip-schedule viewer representation comprises an interactive drop-down menu including a plurality of options for displaying specific service performance information for the plurality of vessels.

5. The method of claim 1, wherein the trip-schedule viewer representation comprises an interactive drop-down menu including a plurality of options for sorting contents of the trip-schedule viewer representation.

6. The method of claim 1, wherein the trip-schedule viewer representation comprises an interactive drop-down menu including a plurality of options for filtering contents of the trip-schedule viewer representation.

7. The method of claim 1, wherein:
upon hovering a pointing device over the trip icon of the plurality of trip icons, first information about the plurality of onboard services provided during the corresponding trip is displayed; and
wherein upon selecting the trip icon of the plurality of trip icons, second information of the plurality of onboard services provided during the corresponding trip is displayed, the second information comprising the pop-window.

8. The method of claim 1, wherein a particular icon displayed next to the trip icon of the plurality of trip icons, indicates whether an open issue has been identified for the corresponding trip.

9. The method of claim 1, wherein a first trip icon and a second trip icon of the plurality of trip icons are separated using an icon representing a location of the vessel between the trips corresponding to the first trip and the second trip.

10. The method of claim 1, wherein the at least one feature is one of a plurality of features associated with a plurality of ranges of performance of the plurality of onboard services, and the at least feature of each trip icon corresponds to the performance of the plurality of onboard services within an associated range of the plurality of ranges during the corresponding trip.

11. The method of claim 10, wherein the performance corresponds to a measured value of the plurality of onboard services during the corresponding trip.

12. An apparatus for displaying onboard service information for vessels, the apparatus comprising:
a processor,
memory in electronic communications with the processor; and
instructions stored in the memory and executable by the processor to cause the processor to perform:
obtaining time range data indicating a time range;
obtaining corresponding trips within the time range for each of a plurality of vessels;
obtaining status of a plurality of onboard services provided during each trip of the corresponding trips for each of the plurality of vessels;
in response to receiving a request for displaying service performance information for the plurality of vessels:
generating first graphical interface data representing:
a plurality of vessel identifiers that corresponds to the plurality of vessels;
a plurality of trip icons for the corresponding trips for each of the plurality of vessels, wherein at least one feature of each trip icon of the plurality of trip icons includes a status indicator feature that indicates an aggregated availability and utilization metric of the plurality of onboard services provided during the corresponding trip, the aggregated availability and utilization metric comprising a status value based on an aggregation of availability and utilization metrics of individual ones of the plurality of onboard services;
a timeline that represents the time range; and
a plurality of pop-windows for the corresponding trips for each of the plurality of vessels, the plurality of pop-windows comprising the availability and utilization metrics for the individual ones of the plurality of onboard services for the corresponding trips for each of the plurality of vessels; and transmitting, to a display device, the first graphical interface data to cause the display device to generate and to display a trip-schedule viewer representation that comprises:
the timeline arranged in a first direction;
the plurality of vessel identifiers arranged in a second direction; and
the plurality of trip icons for the corresponding trips for each of the plurality of vessels including each corresponding status indicator feature, wherein the plurality of trip icons is arranged in the second direction according the plurality of vessel identifiers that corresponds to the plurality of vessels, and wherein each trip icon of the plurality of trip icons is further placed along the first direction according to a corresponding service start time and a corresponding service stop time of the onboard service provided during the corresponding trip; and
wherein upon selecting a trip icon of the plurality of trip icons, a corresponding pop-window of the plurality of pop-windows is displayed.

13. The apparatus of claim 12, wherein the status indicator feature of the plurality of onboard services provided during a completed trip, of the corresponding trips, includes information about the plurality of onboard services provided during an entire duration of the completed trip; and
wherein the status indicator feature of the onboard service provided during an ongoing trip, of the corresponding trips, includes a last-known service performance status for the ongoing trip corresponding to the aggregated availability and utilization metric of the plurality of onboard services provided to a current time.

14. The apparatus of claim 12, wherein:
the time range data includes a current time indicator;
the current time indicator is graphically depicted in the trip-schedule viewer representation as a line segment oriented in the second direction; and
the current time indicator visually separates, in the trip-schedule viewer representation, completed trips from future-scheduled trips.

15. The apparatus of claim 12, wherein the trip-schedule viewer representation comprises an interactive drop-down menu including a plurality of options for displaying specific service performance information for the plurality of vessels.

16. The apparatus of claim 12, wherein the trip-schedule viewer representation comprises an interactive drop-down menu including a plurality of options for sorting contents of the trip-schedule viewer representation.

17. The apparatus of claim 12, wherein the trip-schedule viewer representation comprises an interactive drop-down menu including a plurality of options for filtering contents of the trip-schedule viewer representation.

18. The apparatus of claim 12, wherein:
upon hovering a pointing device over the trip icon of the plurality of trip icons, first information about the plurality of onboard services provided during the corresponding trip is displayed; and
wherein upon selecting the trip icon of the plurality of trip icons, second information of the plurality of onboard services provided during the corresponding trip is displayed, the second information comprising the pop-window.

19. The apparatus of claim 12, wherein a particular icon displayed next to the trip icon of the plurality of trip icons, indicates whether an open issue has been identified for the corresponding trip.

20. The apparatus of claim 12, wherein a first trip icon and a second trip icon of the plurality of trip icons are separated using an icon representing a location of the vessel between the trips corresponding to the first trip and the second trip.

21. The apparatus of claim 12, wherein the at least one feature is one of a plurality of features associated with a plurality of ranges of performance of the plurality of onboard services, and the at least feature of each trip icon corresponds to the performance of the plurality of onboard services within an associated range of the plurality of ranges during the corresponding trip.

22. The apparatus of claim 21, wherein the performance corresponds to a measured value of the plurality of onboard services during the corresponding trip.

* * * * *